United States Patent
Daniel (12)

(10) Patent No.: US 12,540,566 B2
(45) Date of Patent: *Feb. 3, 2026

(54) ENERGY RECOVERY SYSTEM AND METHODS OF USE

(71) Applicant: Guy James Daniel, Katy, TX (US)

(72) Inventor: Guy James Daniel, Katy, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,870

(22) Filed: Mar. 6, 2024

(65) Prior Publication Data

US 2024/0247598 A1 Jul. 25, 2024

Related U.S. Application Data

(63) Continuation-in-part of application No. 17/371,053, filed on Jul. 8, 2021, now Pat. No. 11,952,920.

(51) Int. Cl.
*F01K 3/08* (2006.01)
*F01K 3/26* (2006.01)
*F28D 20/00* (2006.01)

(52) U.S. Cl.
CPC ............. *F01K 3/08* (2013.01); *F01K 3/26* (2013.01); *F28D 2020/0013* (2013.01);
(Continued)

(58) Field of Classification Search
CPC . F01K 23/00; F01K 3/186; F01K 3/08; F01K 3/26; H02K 7/1823;
(Continued)

(56) References Cited

U.S. PATENT DOCUMENTS 1,841,528 A * 1/1932 Gebhardt .............. F28D 7/1653
165/145
2,933,885 A * 4/1960 Vago ........................ F01K 3/00
126/646

(Continued)

FOREIGN PATENT DOCUMENTS

WO WO-2015149124 A1 * 10/2015 ............. F01K 13/00
WO WO-2022160004 A1 * 8/2022 ......... F28D 20/0056

*Primary Examiner* — Tulsidas C Patel
*Assistant Examiner* — Thomas K Quigley
(74) *Attorney, Agent, or Firm* — Phillip Black; Dossey & Jones PLLC

(57) ABSTRACT

A system and method are provided for storing and recovering electricity generated from conventional/renewable energy sources. A thermal energy storage vessel contains thermal storage fluid ("TSF") comprising a eutectic ternary nitrate molten salt, induction heating elements, turbine pumps, a heat exchanger, and various data acquisition sensors like thermocouples and thermistors. The immersion heating elements receive the electricity generated from conventional and/or renewable energy source to heat the eutectic ternary nitrate molten salt to the desired temperature. Coiled tubing is deployed within the thermal containment vessel to be distribution systems for the power cycle working gas and heat exchange for the power cycle working gas. The power cycle working gas is delivered under pressure to a steam turbine or a gas turbine or industrial heat. The turbine converts the energy into mechanical shaft work to drive an electricity generator to produce electricity. The steam exhaust is gathered by a compressor and returned to the thermal energy storage vessel.

22 Claims, 26 Drawing Sheets

(52) U.S. Cl.
CPC ............... *F28D 2020/0047* (2013.01); *F28D 2020/0069* (2013.01); *F28D 2020/0078* (2013.01)

(58) Field of Classification Search
CPC ..... F28D 2020/0013; F28D 2020/0047; F28D 2020/0069; F28D 2020/0078
See application file for complete search history.

(56) References Cited

U.S. PATENT DOCUMENTS

| | | | | |
|---|---|---|---|---|
| 3,716,099 | A * | 2/1973 | Deschamps | F28F 13/06 165/135 |
| 5,030,863 | A * | 7/1991 | Yoshimura | H02K 9/20 310/58 |
| 5,944,089 | A * | 8/1999 | Roland | F28D 1/0475 165/145 |
| 6,489,697 | B1 * | 12/2002 | Ozawa | H02K 3/30 310/58 |
| 8,955,320 | B2 * | 2/2015 | Xiang | F28D 20/021 60/659 |
| 9,541,070 | B2 * | 1/2017 | Bergan | F24S 23/00 |
| 9,773,574 | B2 * | 9/2017 | Peterson | G21C 13/02 |
| 10,012,113 | B2 * | 7/2018 | Vamvas | F28D 20/02 |
| 11,085,705 | B2 * | 8/2021 | Johnson | F28D 20/0056 |
| 2003/0155111 | A1 * | 8/2003 | Vinegar | E21B 36/04 166/59 |
| 2004/0099261 | A1 * | 5/2004 | Litwin | F24S 20/20 126/638 |
| 2004/0244376 | A1 * | 12/2004 | Litwin | F24S 20/20 60/641.8 |
| 2008/0128134 | A1 * | 6/2008 | Mudunuri | E21B 43/30 166/302 |
| 2008/0131830 | A1 * | 6/2008 | Nix | F24S 10/45 432/220 |
| 2008/0276616 | A1 * | 11/2008 | Flynn | F28D 20/021 126/400 |
| 2008/0289793 | A1 * | 11/2008 | Geiken | F24S 80/20 165/10 |
| 2010/0175689 | A1 * | 7/2010 | Zillmer | F16L 9/18 126/609 |
| 2010/0314081 | A1 * | 12/2010 | Reis | F28F 21/02 165/134.1 |
| 2011/0017196 | A1 * | 1/2011 | Bell | F24H 1/208 126/400 |
| 2011/0219771 | A1 * | 9/2011 | Stiesdal | F28D 20/021 60/670 |
| 2011/0313218 | A1 * | 12/2011 | Dana | C10B 53/06 208/400 |
| 2012/0319410 | A1 * | 12/2012 | Ambrosek | F02C 6/10 290/1 R |
| 2013/0056169 | A1 * | 3/2013 | Stiesdal | F28D 20/021 165/10 |
| 2014/0053554 | A1 * | 2/2014 | Tartibi | F01K 3/186 60/643 |
| 2014/0060046 | A1 * | 3/2014 | Takahashi | F24S 10/30 126/618 |
| 2014/0366536 | A1 * | 12/2014 | Muren | F03G 6/065 126/618 |
| 2015/0143806 | A1 * | 5/2015 | Friesth | F03G 7/04 220/592.2 |
| 2015/0167648 | A1 * | 6/2015 | Bergan | F24S 23/00 60/641.15 |
| 2015/0171455 | A1 * | 6/2015 | Mills | H01M 8/0656 429/422 |
| 2015/0267566 | A1 * | 9/2015 | Vamvas | F28D 20/02 60/659 |
| 2016/0024924 | A1 * | 1/2016 | Anthony | F01B 29/06 60/531 |
| 2016/0047212 | A1 * | 2/2016 | Vinegar | F24H 1/0018 166/57 |
| 2016/0115945 | A1 * | 4/2016 | Barsi | F24S 60/10 126/618 |
| 2016/0320145 | A1 * | 11/2016 | Bergan | B23P 15/26 |
| 2017/0141724 | A1 * | 5/2017 | O'Donnell | F24T 10/15 |
| 2017/0363368 | A1 * | 12/2017 | Bergan | F28D 20/0056 |
| 2019/0153284 | A1 * | 5/2019 | Meroueh | C09K 5/063 |
| 2020/0018557 | A1 * | 1/2020 | Johnson | F28D 20/02 |
| 2020/0132393 | A1 * | 4/2020 | Phillips | F28F 21/04 |
| 2020/0385287 | A1 * | 12/2020 | Cen | B01D 3/06 |
| 2022/0307386 | A1 * | 9/2022 | Savic | F01D 25/00 |
| 2022/0373269 | A1 * | 11/2022 | Sherman | F28D 20/0043 |

* cited by examiner

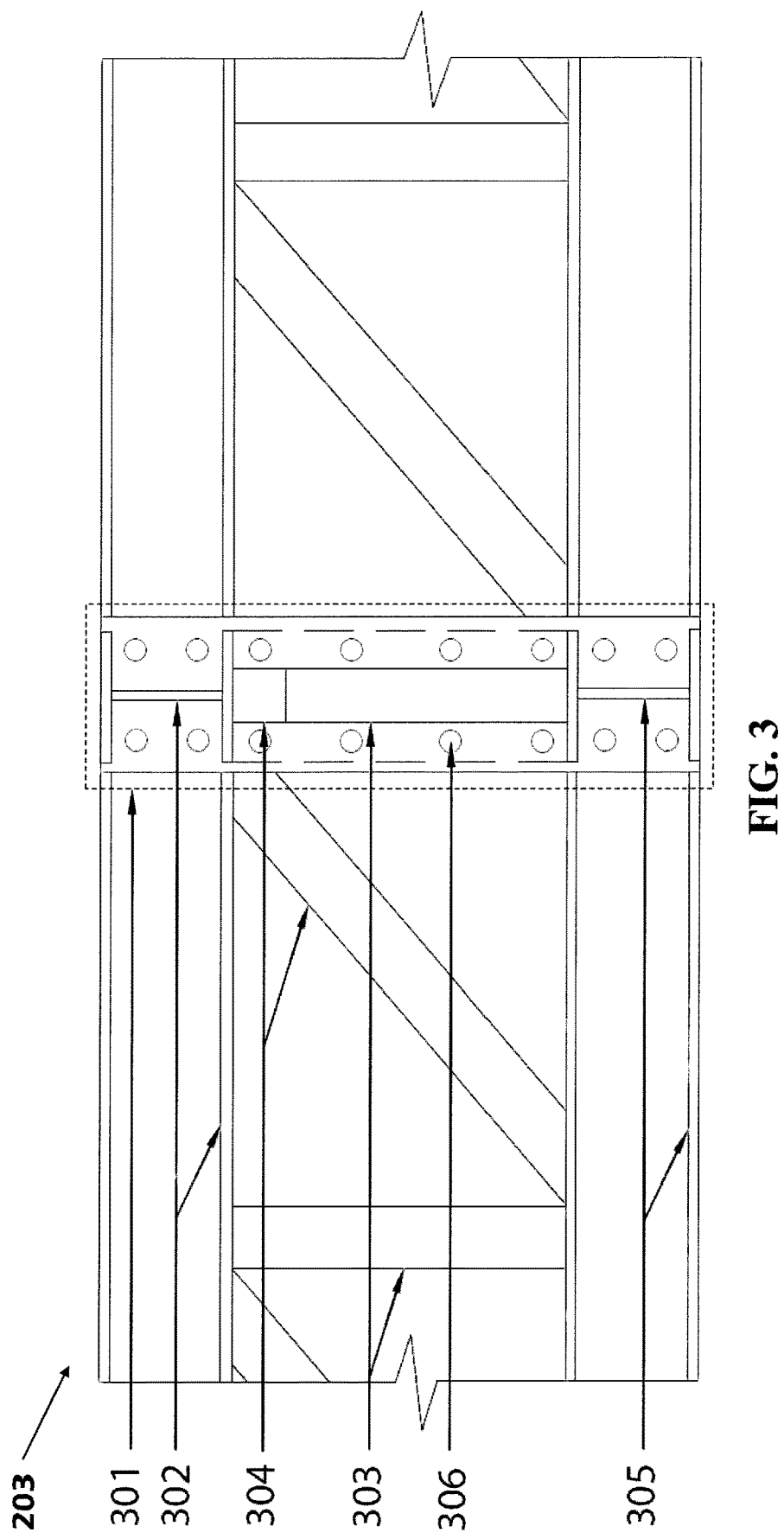

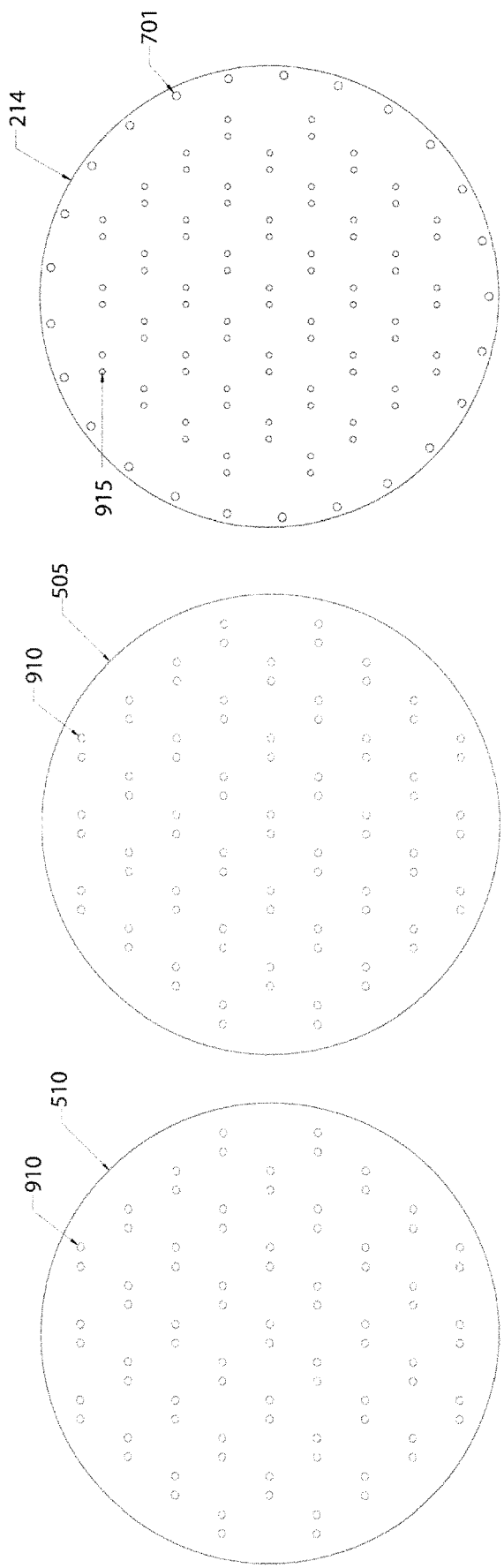

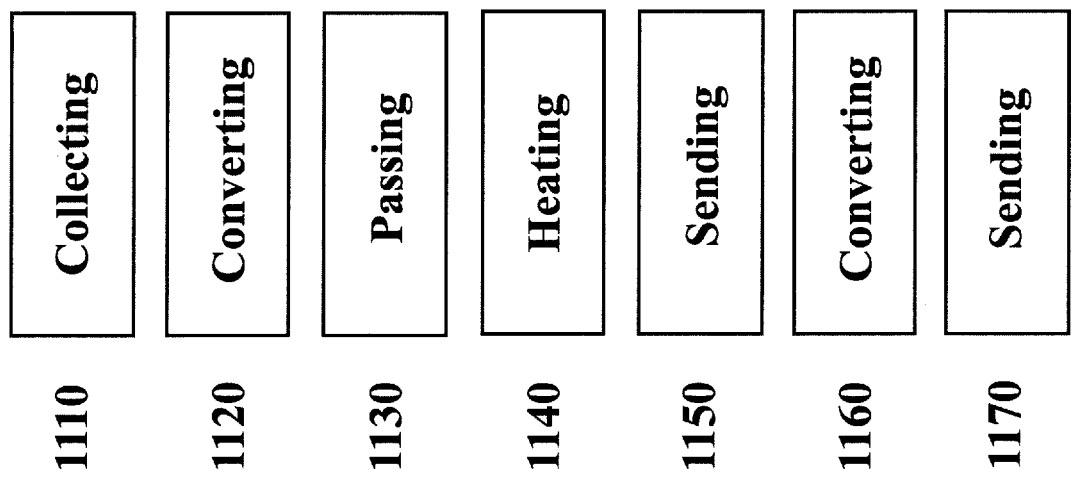

ENERGY RECOVERY SYSTEM AND METHODS OF USE

FIELD OF THE INVENTION

The disclosure relates generally to energy recovery systems, and more specifically to thermal energy systems for storing and recovering electricity generated from conventional and/or renewable energy sources.

BACKGROUND OF THE INVENTION

Power (referring to electrical) output from resourced-constraint resources (referring to wind, solar photovoltaic, biomass, geothermal, ocean, and some hydropower generation technologies (also known as variable renewable energy ("VRE") resources)) are dependent on a variety of factors that can affect the power output from these natural resources. Renewable energy sources, with the current state of technology, are not able to supply a base load power generation and are considered non-dispatchable generation resources. Although, during optimal conditions, renewable energy sources can produce large amounts of energy. Electrical grid systems with a high penetration of VRE generators represent a significant challenge to system operators because of the lack of system flexibility, and increased stability challenges due to transmission congestion or excess generation during low load periods. Therefore, storing energy is the major building block for our energy future which has not been solved at the utility-grid scale in a viable, long-duration (greater than 12-hours) and eco-efficient methodology.

In response to the intermittent nature of VRE resources, energy storage systems are provided to the renewable power sources in order to capture the energy. Energy storage technologies are of the utmost importance for balancing supply and demand of electricity generation, distribution, and usage. Lithium-Ion Batteries ("LIB") are typically utilized for direct electric energy storage in such applications as conventional, photovoltaic and wind power plants. The high intrinsic cost of Lithium-ion batteries, generally, makes the technology cost-prohibitive as an energy storage system. These high costs are attributed to the vulnerabilities in the supply-chain such as high market demands for lithium and cobalt ores, geographical location, ground & marine logistics, geopolitical risk, adverse environmental, social, and economic impacts which are all well documented.

Thermal energy storage ("TES") is extremely cost effective and is intrinsically low cost, due to the availability of inexpensive materials for thermal storage fluid ("TSP") and heat transfer fluid ("HTF"), scalability (small to grid-level), long life and environmental friendliness of TES. Molten salt ("MS"), an important component of TES, has been used in different industrial applications for about 610 years to date. In addition, nitrate salts have been used for decades in the concentrating solar power industry as latent thermal storage and as an HTF. The main factor affecting the performance of a TES system is the thermal stability of the materials used to store the heat. Currently, eutectic ternary- and binary molten salts (collectively molten salts) are the most utilized materials for TES at high temperatures due to several physical properties that they exhibit.

The performances of TES systems, connected to the energy production or process heating systems, rely heavily on the maximum optimization of the thermodynamic properties of molten salts which typically have a substantially higher specific gravity than other less desirable heat transfer fluids. Molten salts are a great and effective way to store energy for future use due to the vast heat storage capacities and their ability to store heat for long periods of time. The aspects of molten salts that must be considered are the physical properties, including melting point, density, viscosity, surface tension, buoyancy, explosiveness, flammability, toxicity of vapors, heat capacity, and electrical conductance.

Nitrate Molten Salts are inorganic, nonaqueous media, a eutectic ternary mixture comprising of at least two of the Nitrate compounds of $NaNO_3$, $Ca(NO_3)_2$ and $KNO_3$ or a binary mixture comprising of $NaNO_3$ and $KNO_3$ (also known as solar salt) used as a low-cost and thermal energy storage in power plants which improves the dispatchability and marketability of the produced electrical power. Nitrate Molten Salt Thermal Energy Storage Systems do not have any of the adverse environmental issues associated with lithium-ion batteries, such as water use and $CO_2$ emissions, social issues associated with the mining of rare metals, disposal or recycling of the batteries or the operational challenges as associated with the LIBs. Nitrate Molten Salts are suitable thermal storage fluid, with a liquid phase temperature range from about 131 to 630 degrees Celsius (° C.) and decomposition commencing above 630° C. Molten salts are non-flammable, non-explosive and evolve no toxic vapors under recommended conditions of use, and therefore are strong proven candidates for HTFs and thermal storage fluids ("TSFs"). The specific heat capacity of molten salts ranges from 1.18 to 1.9 kJ/kg K with an average thermal conductivity range from 0.38 to 0.88 W/mK and a density ranging from 1.3 to 1.96 g/cm$^3$. Nitrate Molten Salts, consisting of a purity >95%, can be heated to 565° C. with minimum corrosion to the insulated containment vessel and piping alloy metals. Nitrate molten salts are desired because these types of fluids enhance the overall efficiency of the plants by utilizing less energy to keep the salt in the liquid state and by producing superheated steam at higher temperatures in the Steam Rankine Cycle to drive large scale steam turbines for electrical power generation or by producing supercritical carbon dioxide ($sCO_2$) based closed cycle gas turbine in the Brayton Cycle or alternatively for producing heat or steam for process heating systems.

The three most common forms of concentrated solar power ("CSP") are (i) the trough system that uses mirrored parabolic troughs or linear Fresnel mirror system, (ii) the central receiver systems or solar power tower ("SPT") combined that uses heliostat fields, and (iii) the dish system, which uses dish-shaped parabolic mirrors. In a CSP plant during the day, sun radiation energy is captured in a concentrated way by means of mirrors. The concentrated sun radiation energy is typically used, either directly or indirectly, to heat an HTF, usually a mass of molten salts comprised mostly of a mixture of nitrates. The TES system stores molten salts in paired tanks ("hot" and "cold" storage tanks). Alternatively, in a "thermocline" storage tank system, the "hot" and "cold" molten salt is stored in a single-tank system. The thermocline storage tank system is an economical alternative to the two-tank Storage system. The advantage of this type of TES is that it is a mature technology and has been demonstrated in Gigawatt-hour capacity at low cost. However, the challenges with these types of TES systems are heat loss, heat exchanger performance, reliability, parasitic power losses, transient HTF freezing or solidification fouling from solid-salt deposit forming on the pipe walls.

TES systems typically consist of three thermal fluids: (i) the thermal storage fluid, (ii) the heat transfer fluid, and (iii) the power cycle working fluid/gas. Energy from conventional and renewable utility power generation is stored in a thermal storage fluid as latent during the initial charging phase and as sensible heat during the secondary charging phase, typically a molten salt fluid. The HTFs are pumped through a closed loop that originates from the TES tank, pumped to the heat collector/energy source, and then pumped back to the TES. HTFs transfer the heat from an energy source to thermally heat a thermal fluid for storage (is later discharged back to the TES), to directly heat a power cycle working liquid through a heat exchanger. The power cycle working gas receives the heat from the heat exchanger and drives a Rankine Cycle or Brayton Cycle turbine to generate electric power. Heat transfer fluids are typically either a gas or a liquid. The liquid HTFs are molten salts and heat conducting oil. The gas HTF is superheated/supercritical steam and supercritical carbon dioxide. When $sCO_2$ is held above its critical temperature and pressure, it acts like a gas yet has the density of a liquid. In this supercritical state, small changes in temperature or pressure cause dramatic shifts in density of the $sCO_2$ thereby making $sCO_2$ a highly efficient working fluid for power generation. HTFs are pumped from the TES to a heat exchanger and pumped back to the TES.

The Rankine Cycle or the Brayton Cycle is a thermodynamic cycle that primarily transfers force, motion, or mechanical energy. The heat is supplied via a closed loop by a power cycle working gas under high temperatures and under intense pressure. The power cycle working gas is either a liquid or a gas. The power cycle working gases are $sCO_2$. The power cycle working gas is pressurized to the desired working pressure and heated to the desired working temperature through the interface with a heat exchanger. In the case of the liquid, the liquid will undergo a liquid to gas phase transition. When the power cycle working gas reaches the steam turbine, the kinetic energy stored within the power cycle working gas provides the thermodynamic system to convert the heat energy into mechanical energy to generate electricity. The steam turbine then exhausts the heat which cannot be used to do work and is sent to a condensing tower and returned to the heat exchanger.

The problems to address and resolve that are associated with renewable energy plants and conventional energy plants regarding TES and conversion of the TES to electricity include those relating to the heating of the TSF, the transferring of the heat from the TES to the HTF, the pumping of the HTF to a heat exchanger, and the pumping of the HTF back to the TES.

The main problems are briefly summarized as follows:

The major disadvantages contributed to CSP, wind and photovoltaic energy production is that power output from renewable energy sources is dependent on a variety of factors that can affect the power output from these natural resources. Wind can only be produced when the wind is blowing, and photovoltaics are dependent on sunlight to effectively gather solar energy. Power is produced in an intermittent fashion for these technologies. Battery systems for wind and photovoltaics are generally manufactured from lithium and cobalt materials which are subject to supply risks and other vulnerabilities, and lithium-ion battery technology is directly associated with adverse environmental issues. In addition, lithium-ion batteries are generally not cost effective for grid-level energy storage because of the capital cost for the installation of the lithium-ion batteries.

The major disadvantage of molten salts (as an HTF) is their relatively high melting temperature which requires measures in order to maintain the salts above their melting temperatures. The density of molten salts is four times the density (or specific gravity) of water. Consequently, the structural loads on the containment vessel are very high and the energy required to pump molten salts is greater than that of pumping oil or water HTFs. The system components, such as containment vessel, heat exchanger, pumping equipment, piping, and valves will undergo repeated thermal expansion and contraction, and must be able to accommodate such extreme thermal cycling without any structural failures to these components. In addition to being able to hold large quantities of heat, molten salts can be corrosive. Therefore, the materials used for the containment vessel, heat exchanger, pumping equipment, piping, and valves must be resistant to sulfiding, carburizing, aquatic fracturing, and oxidizing conditions at extremely high temperatures and offer enhanced services that do not require regular maintenance. The challenges with these types of TES systems are heat loss, heat exchanger performance, reliability, parasitic power losses, transient HTF freezing or solidification fouling from solid-salt deposit forming on the pipe walls.

Following operational safety, operational reliability is a priority. A need exists for a TES system that has a high degree of operational reliability and consequently, a high degree of serviceability.

BRIEF SUMMARY OF THE INVENTION

The disclosed subject matter provides an energy recovery system including a thermal energy storage ("TES") insulated containment vessel for storing and recovering electricity generated from at least one energy source. The system comprises the thermal energy storage insulated containment vessel which converts electricity into an alternative energy source. The alternative energy source may be a thermal energy source such as latent and sensible heat. An electrical connection is established between at least one energy source and the TES insulated containment vessel in order to receive the electricity from that energy source to the TES insulated containment vessel. Once the electricity is converted into an alternative energy source, such as heat, the heat (carried via a power cycle working gas) is transferred to a steam turbine in the Rankine Cycle or the $sCO_2$ based closed cycle gas turbine in the Brayton Cycle where it is converted into rotational energy which is in turn converted into electrical energy via a generator. An energy exchange interface then returns the electricity to a grid, or for self-generation, or partial charging of the TES system via an energy exchange interface. When used in the Brayton Cycle, the power cycle working gas may be supercritical carbon dioxide ($sCO_2$), subcritical/superheated/supercritical steam, or any combination thereof.

Alternatively, once the electricity is converted into an alternative energy source, such as sensible heat stored in the TSF, the heat (carried via a working gas) is a decarbonized method of producing heat for delivery to industrial process heat systems.

A TES insulated containment vessel is provided for storing and recovering electricity generated from at least one energy source. The TES insulated containment vessel comprises a vessel floor, a vessel roof, and a plurality of walls affixed to the vessel floor and the vessel roof. A first pipe header is affixed to at least one supply pipe (discharge side) while a second pipe header is affixed to at least one return pipe (charge side). A third pipe header is affixed to at least one reheater supply pipe (discharge side) and a fourth pipe header is affixed to at least one reheater return pipe (charge side). Matching sets of supply pipes and return pipes may each be affixed to a tubing that may be coiled around an electrical resistance immersion heating element. The thermal conductive helical coiled tubing and electrical resistance immersion heating element combination are at least partially submerged in a thermal storage fluid contained within the insulated containment vessel in order to transfer heat from an electrical resistance heating element to the thermal storage fluid. The coiled tubing acts as a thermosyphon device (heat exchanger) that is located within the TES insulated containment vessel to transfer the sensible heat stored in the TSF to the working gas.

A method is provided for recovering electricity generated from at least one energy source. The method includes collecting electricity from the at least one energy source in a TES insulated containment vessel. The electricity is then converted to heat via at least one electric resistance immersion heating element positioned within the TES insulated containment vessel at least partially submerged in a thermal storage fluid heated by the heat from the electric resistance immersion heating element. In this method, the nitrate molten salt is the TSF and in the process will be the heat transfer fluid. During the energy recovery regime, a power cycle working gas is passed through tubing associated with each of the electric resistance immersion heating elements which the electric resistance immersion heating elements may or may not be de-activated. When this occurs, the power cycle working gas is heated via the sensible heat transferred from the thermal storage fluid (energy recovery cycle). Once heated, the power cycle working gas is sent to a multi-stage multi-cylinder turbine to convert the heat from the pressurized steam into mechanical energy by the turbine rotors collecting the energy from the steam path, converting the steam into rotational energy to turn a drive shaft, the rotation of the shaft induces electromagnetic force in the generator to produce usable electricity. The on-demand clean electricity is dispatched to the utility grid, or for self-generation, or for partial charging of the TES system. Alternatively, once the electricity is converted into an alternative energy source, such as sensible heat stored in the TSF, the heat (carried via a working gas) is a decarbonized method of producing heat for delivery to industrial process heat systems.

The electric resistance immersion heating element and the associated power cycle working gas tubing and the reheater tubing are assembled as a unit which are all connected to the lifting flange that may exist as one contiguous and solitary component deployed vertically from the roof of the insulated containment vessel.

The molten salt vertical turbine pump is utilized to relocate the thermal storage fluid from the bottom of the containment vessel to the top of the column of the thermal storage fluid to create turbulence within the TSF, thereby reducing thermal stratification in the TSF and increasing the system's overall efficiency rating during the energy recovery and charging cycles.

The TSF is stored within an insulated containment vessel comprising of an interior containment vessel that is constructed with a cladding of stainless-steel liner with carbon steel, and may be alloy of stainless-steel that may be rolling-press cladding metallurgical bonded to carbon steel, a layer of ceramic may be installed on the surface of the stainless-steel cladding, an insulation layer of ceramic wool located between the roof of the internal containment vessel and the roof of the outer shell and located between the walls of the inner containment vessel and the carbon steel outer shell serves as a structural layer, an internal layer of insulating fire brick joined with a very high temperature concrete mortar is located between the floor of the interior containment vessel and the base of the outer shell, below the insulating fire brick layer is a sand layer that encompasses a thermosyphon device to serve as a method of passive heat exchange based on natural convection, the sand layer is encompassed by a carbon steel plate, below the sand layer is a refractive concrete foundation, flanges are mounted on top of the roof of the outer shell with the base of the flange extending downward to the interior insulated containment vessel and is open to the insulated containment vessel below for receiving and mounting of equipment, instrumentation, and piping, an area to accommodate the sloshing of the thermal energy fluid during a seismic activity is located within the top portion of the interior insulated containment vessel, the outer shell is constructed with carbon steel covered with an industrial coating.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein:

FIG. 3 displays a sectional view of roof trusses of a thermal energy storage vessel in accordance with embodiments.

FIG. 9A displays a top view of a heat shield including baffle orifices in accordance with embodiments.

FIG. 9B displays a top view of a baffle including heat shield orifices in accordance with embodiments.

FIG. 9C displays a top view of a flange including flange orifices in accordance with embodiments.

FIG. 11 displays a method for recovering electricity generated from at least one energy source.

DETAILED DESCRIPTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1A:
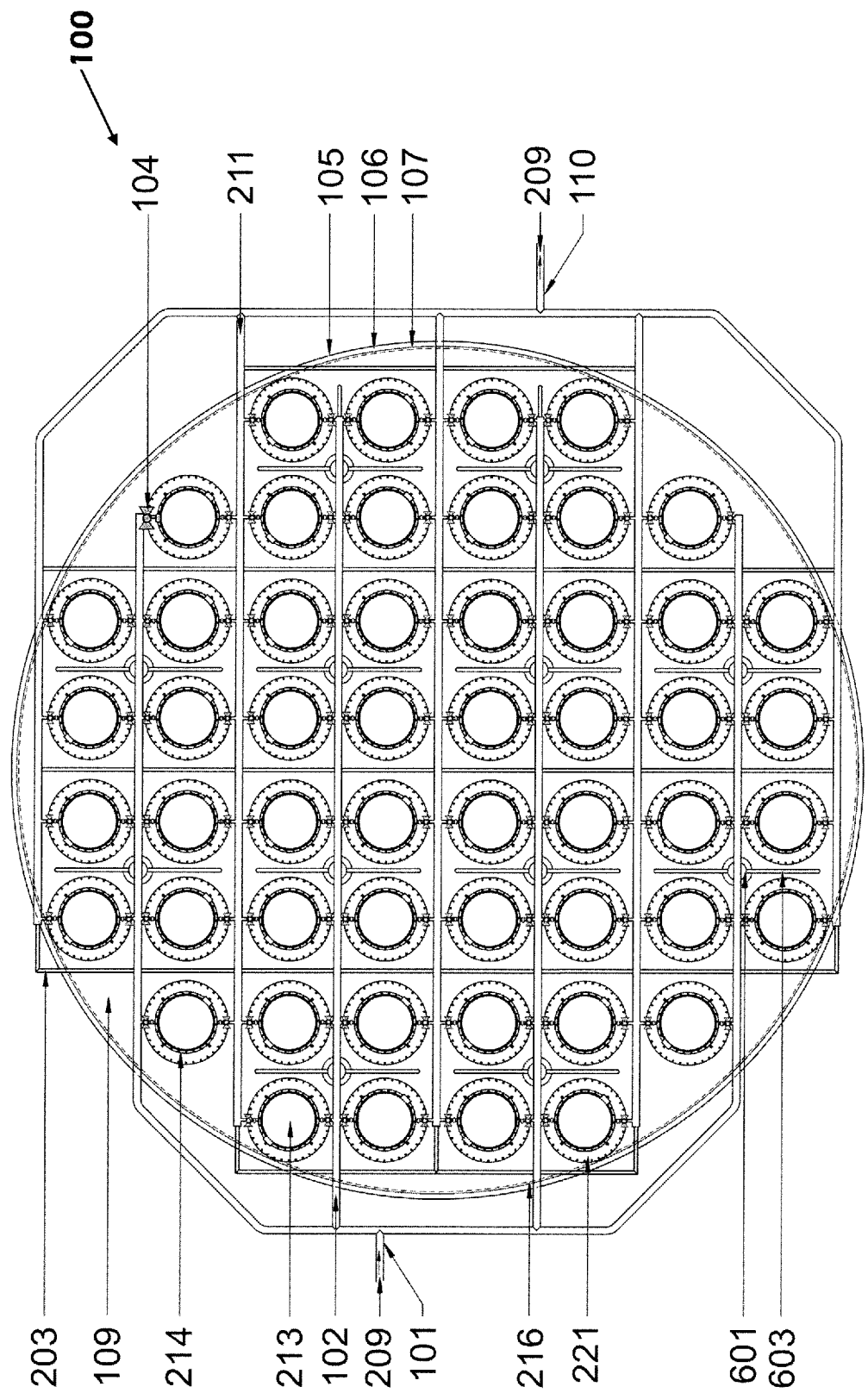
FIG. 1A displays a plan view of a thermal energy storage (TES) vessel in accordance with embodiments.

FIG. 1A displays a plan view of a thermal energy storage (TES) vessel 100. TES vessel 100 may comprise an outer vessel wall 105 and an inner vessel wall 107 with a thermal insulation layer 106 positioned between the outer vessel wall 105 and the inner vessel wall 107. At least one heating element 108 is positioned within the vessel 100, with each of the heating elements 108 surrounded by a power cycle working gas tubing 103. The heating elements 108 may be indirectly connected to sources of energy and may convert this energy from electricity to heat (since the heating element 108 acts as a resistor); the heat is then stored in a thermal storage fluid (TSF) 109. The power cycle working gas tubing 103 provides exposure of a power cycle working gas 209 (FIG. 2A) and (FIG. 2B), or power cycle working gas (in this case, steam), to heat stored as sensible heat in the thermal storage fluid 109.

The thermal storage fluid 109 may be at least one of a nitrate molten salt. The molten salt may comprise at least one of $NaNO_3$, $Ca(NO_3)_2$ and $KNO_3$.

In order to heat the power cycle working gas 209, a gas return pipe 101 connected to a gas return pipe header 102 provides the power cycle working gas 209 to TES vessel 100. A series of valves 104 connected to a gas return pipe header 102 allows passage of the power cycle working gas 209 into TES vessel 100 where it travels through heat transfer fluid in tubing 103, increasing in temperature as it travels through the power cycle working gas tubing 103. Once the power cycle working gas 209 has gathered heat, it exits TES vessel 100 through gas supply header 211 to a gas supply pipe 110 and is sent to high-pressure steam turbine 1011 and generator 1014 and subsequently dispatch to the power grid as grid supply 1050, or for partial charging of the TES system 1051, or for self-generation 1052 (See FIGS. 10A-C). After leaving the high-pressure steam turbine 1011, the power cycle working gas is sent to the condenser 1012 and subsequently back to the TES vessel 100 for recharging.

Figure 1B:
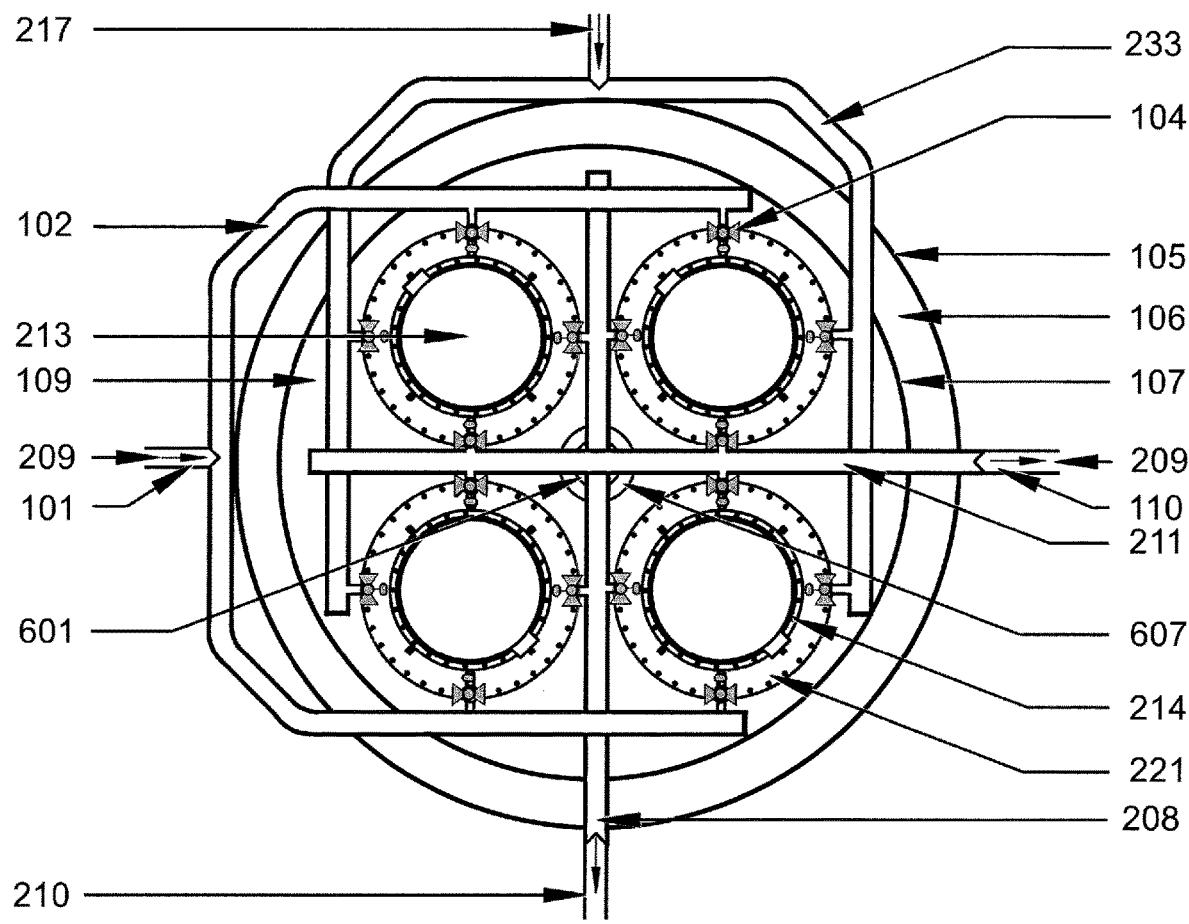
FIG. 1B displays a plan view of a thermal energy storage vessel in accordance with embodiments.

FIG. 1B displays a plan view of a thermal energy storage (TES) vessel 100 in an alternative embodiment. TES vessel 100 may comprise an outer vessel wall 105 and an inner vessel wall 107 with a thermal insulation layer 106 positioned between the outer vessel wall 105 and the inner vessel wall 107. At least one heating element 108 is positioned within the vessel 100, with each of the heating elements 108 surrounded by a power cycle working gas tubing 103 and reheat tubing 111. The heating elements 108 surrounded by a power cycle working gas tubing 103 and the reheat tubing 111 are in thermal communication with the thermal storage fluid. The heating elements 108 may be indirectly connected to sources of energy and may convert this energy from electricity to heat (since the heating element 108 acts as a resistor); the heat is then stored in a thermal storage fluid (TSF) 109. The power cycle working gas tubing 103 and the reheat tubing 111 provides exposure of a power cycle working gas 209 (FIG. 2A) and (FIG. 2B), or power cycle working gas (in this case, steam), to heat stored as sensible heat in the thermal storage fluid 109.

In order to reheat the power cycle working gas 209, the power cycle working gas exits the high-pressure steam turbine via a cold-reheat line 217 which is connected to a gas reheat return pipe header 233 provides the power cycle working gas 209 to TES vessel 100. A series of valves 104 connected to a gas reheat return pipe header 233 allows passage of the power cycle working gas 209 into TES vessel 100 where it travels through heat transfer fluid in reheat tubing 111, increasing in temperature and pressure as it travels through the reheat tubing 111. Once the power cycle working gas 209 has gathered heat, it exits TES vessel 100 through gas reheat supply header 208 to a reheat gas supply line 210 and is sent to intermediate-pressure steam turbine 1015 and then to the low-pressure steam turbine 1016 to convert the heat from the pressurized steam into mechanical energy by the turbine rotors collecting the energy from the steam path, converting the steam into rotational energy to turn a drive shaft 242, the rotation of the shaft induces electromagnetic force in the generator to produce electricity to subsequently dispatched to the power grid as grid supply 1050, or for partial charging of the TES system 1051, or for self-generation 1052. After leaving the low-pressure turbine, the power cycle working gas is sent to the condenser 1012 to convert the power cycle working gas back into cooled condensed water to be subsequently stored in the condensate storage tank 1018 until the condensate is called for delivery back to the TES vessel 100 to be recharged.

The thermal conductive helical coiled tubing 103 and the reheat tubing 111 may be optimized in the number of tubes, the position of the tubing in relationship to other tubing and heater element(s), the diameter of the tubing, in the number of revolutions made by the tubing, the spacing between each revolution of the tubing, and the radius of the tubing.

The thickness between the outer vessel wall 105 and the inner vessel wall 107 may be 15.75 inches in thickness. In additional embodiments, the thermal insulation layer 106 may be 2B15.75 inches in thickness.

Figure 2A:
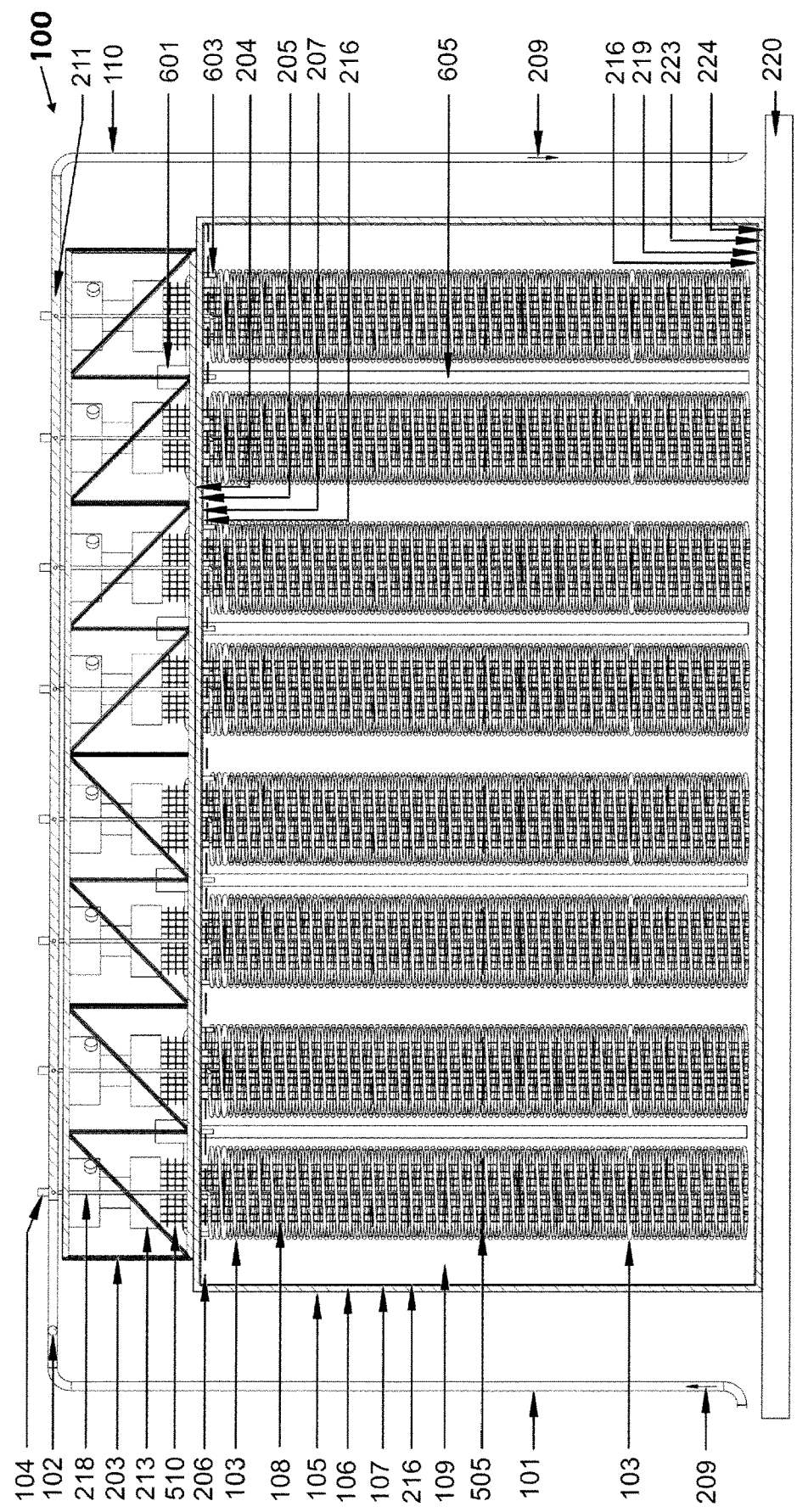
FIG. 2A displays a front elevational cross-sectional view of a thermal energy storage vessel and a portion of components of an energy recovery system in accordance with embodiments.

FIG. 2A displays a front elevational view of a thermal energy storage vessel 100 and a portion of components of an energy recovery system 1010. TES vessel 100 may include an outer wall 105, an inner wall 107, a roof 204, ceiling 207, floor 219, and foundation 220 (optionally made of concrete). The power cycle working gas tubing 103, gas return tubing 218, gas supply tubing 222 and heating elements 108 are integrated with the roof 204/ceiling 207 by the lifting flange 221 so that power cycle working gas tubing 103 and heating elements 108 are suspended from lifting flange 221 downwards into the chamber of TES vessel 100. Roof insulation layer 205, thermal insulation layers 106 and thermal insulation layers 223 are positioned between respective sections of TES vessel 100 in order to properly retain heat to the heat storage fluid 109 supplied by the heating elements 108. A ceramic layer 216 may be positioned adjacent to ceiling layer 207, wall layer 107, and floor layer 219 in order to provide additional insulation for TES vessel 100. The thermal insulation layer 106 may comprise ceramic or wool materials.

Power cycle working gas 209 may be pumped (see FIG. 2A) into TES vessel 100 through gas return pipe 101 connected to gas return pipe header 102 and valves 104. Once the power cycle working gas 209 passes the valves 104, it enters gas return tubing 218 and passes into the bottom of power cycle working gas tubing 103, where it is heated. The heated power cycle working gas 209 then exits power cycle working gas tubing 103 and enters gas supply tubing 222, where it then travels out of valves 104 in gas supply pipe header 211 and ultimately back to (in this case) steam turbine 1011 (see FIG. 10A) through gas supply pipe 110. In embodiments, power cycle working gas tubing 103, gas return tubing 218, gas supply tubing 222, and lifting flange 221 may exist as one contiguous, solitary component. In order for TES vessel 100 to provide optimal heat storage and transfer, TES vessel 100 may be filled with thermal storage fluid 109 to the thermal storage fluid fill level 206. Based on the parameters of the heat transfer process, the height of the thermal storage fluid fill level 206 may vary.

It is noted that the term "return" in the element gas return pipe header 102 may refer to the power cycle working gas 209 being "returned" to TES vessel 100, while the term "supply" in the element gas supply pipe header 211 may refer to the power cycle working gas 209 being "supplied" to steam turbine 1011.

One or more heating elements 108 and the associated power cycle working gas tubing 103 are assembled as a unit which are all connected to the lifting flange 221 that may exist as one contiguous and solitary component which are designed to be easily removable from TES vessel 100 so that TES vessel 100 may continue to store heat without the full capacity of heating elements 108 being utilized. Heating elements 108 may be affixed to the ceiling 207 and/or roof 204 via lifting flange 221, which utilize lifting flange bolts 701 (see FIG. 7A) affixed to roof 204 to keep the heating elements 108 in place. Once bolts 701 are removed, heating element 108 and power cycle working gas tubing 103 are lifted out of TES vessel 100 without the need for TES vessel 100 to be shut down, meaning that there is no operational down time for vessel 100. In order to efficiently hold the weight of heating element 108, TES vessel 100 may utilize roof trusses 203 (positioned on roof 204) as reinforcement. The compact configuration of the heating element 108 and power cycle working gas tubing 103 may allow for easy extraction out of roof 204. In embodiments, weather head 213 may house the electrical components associated with heating elements 108 and may include, but is not limited to induction heater components and thermostats.

Figure 2B:
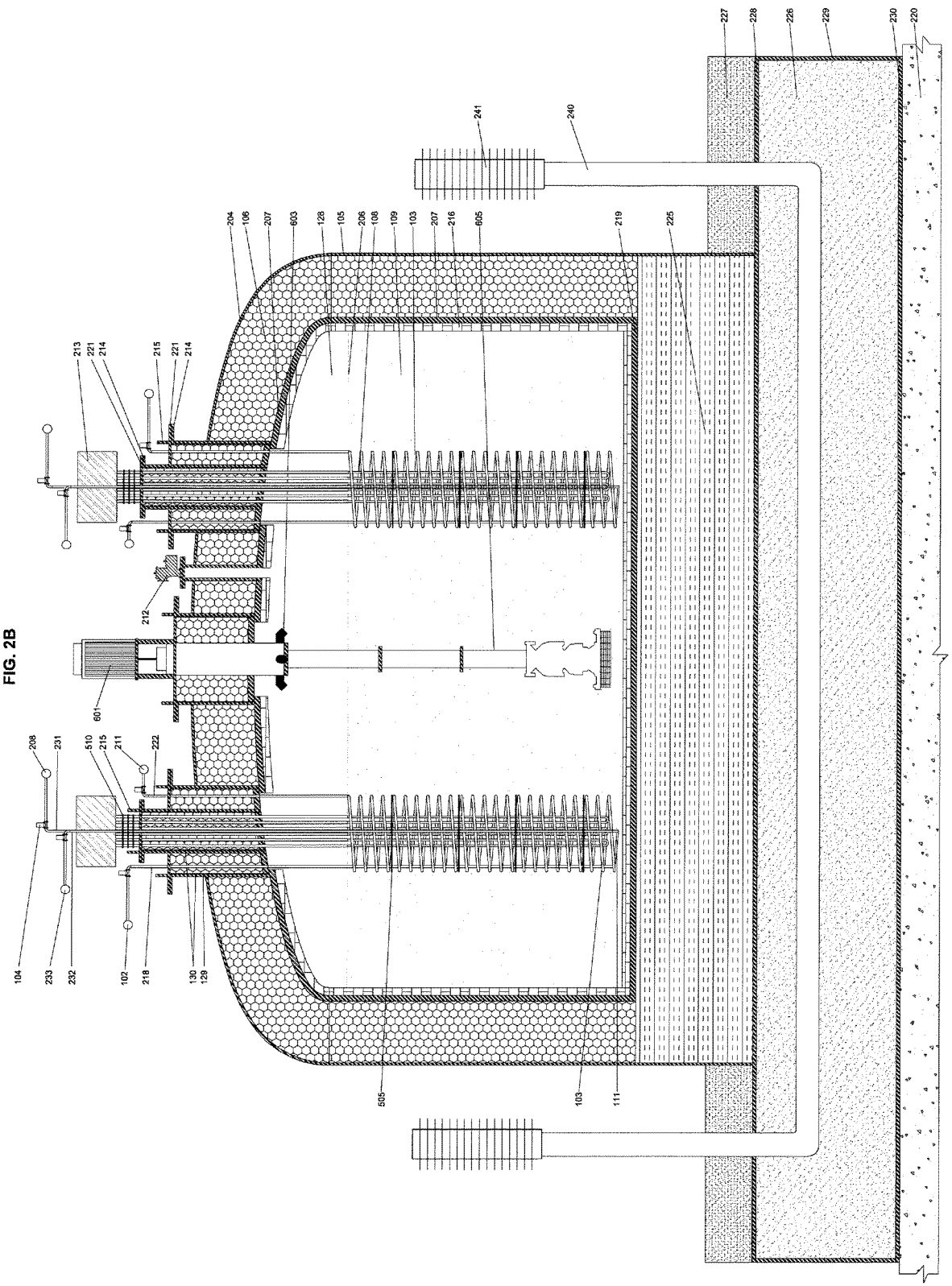
FIG. 2B displays a front elevational cross-sectional view of a thermal energy storage vessel and a portion of components of an energy recovery system with an elliptical and self-supporting roof structure in accordance with embodiments.

FIG. 2B displays a front elevational view of an alternative embodiment of a thermal energy storage vessel 100 and a portion of components of an energy recovery system 1010. TES insulated containment vessel 100 may include an elliptical self-supporting exterior roof and interior ceiling structure. The thermal storage fluid 109 is stored within the TES insulated containment vessel 100. The TES insulated containment vessel 100 may include an interior containment vessel and an outer shell 204. As shown in FIG. 2B, the outer shell may serve as the roof and sidewalls of the vessel. The interior containment vessel may include of a floor 219, ceiling 207, and walls that all such insulated containment vessel components are constructed with a cladding of stainless-steel liner with carbon steel and may be constructed with an alloy of stainless-steel that may be rolling-press cladding metallurgical bonded to carbon steel. A layer of ceramic 216 may be installed on the surface of the stainless-steel cladding. An insulation layer of ceramic wool 106 may be located between the ceiling 207 of the internal containment vessel and the roof 204 of the outer shell 204. The ceramic wool 106 may be located between the walls 107 of the inner containment vessel and the carbon steel outer shell 204. An internal layer of insulating fire brick 225 joined with a very high temperature concrete mortar may be located between the floor 219 of the interior containment vessel and the base of the outer shell 228. Below the insulating fire brick layer may be a sand layer 226 that encompasses a thermosyphon device 240 to serve as a method of passive heat exchange based on natural convection. The sand layer 226 may be encompassed by a carbon steel plate roof 228, walls 229, and floor 230 and below the sand layer 226 may be a refractive concrete foundation 220. Flanges 214 may be installed on top the roof 204 of the outer shell 204 with the base of the flange extending downward to the ceiling 207 of the interior insulated containment vessel and being open to the slosh area 128 of the interior insulated containment vessel below for receiving and mounting of equipment, instrumentation, and piping. The slosh area 128 is to accommodate the sloshing of the thermal energy fluid during a seismic activity and is located within the top portion of the interior insulated containment vessel. As such, the outer shell 204 may be constructed with carbon steel and may be covered with industrial coatings.

Equipment, instrumentation, and piping penetrations may be made vertically through the roof of the outer shell 204 and the interior insulated containment vessel ceiling 207 to allow for maintenance services to be performed on the equipment, instrumentation, and piping without removing the thermal storage fluid 109 from the insulated containment vessel, or the need for a long-term disruption of, or discontinuing of, the operations of the TES system. This configuration is particularly beneficial for efficient operation.

The immersion heaters 213 may be affixed to a flange 214. Flange 214 may be a mounting flange, lifting flange, or both. It may include the power cycle working gas return tubing 218, the power cycle working gas supply tubing 222, the power cycle working gas reheat supply tubing 231, and the power cycle working gas reheat return tubing 232. The flange 214 is affixed to the lifting flange 221 (See FIG. 7A and FIG. 7B). The immersion heaters 213, power cycle working gas return tubing 218, the power cycle working gas supply tubing 222, the power cycle working gas reheat supply tubing 231, and the power cycle working gas reheat return tubing 232 may be installed vertically in an array around a molten salt vertical turbine pump 601, which may be affixed to a mounting flange 604 on the top of the outer shell 204 and penetrates downward into the heel of the insulated containment vessel. The immersion heaters 213, power cycle working gas return tubing 218, the power cycle working gas supply tubing 222, the power cycle working gas reheat supply tubing 231, and the power cycle working gas reheat return tubing 232 are in thermal communication with the thermal storage fluid.

The power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232 may be optimized in the number of tubes, the position of the tubing in relationship to other tubing, the diameter of the tubing, in the number of revolutions made by the tubing.

The power cycle working gas tubing 103, the power cycle working gas reheat tubing 111 may be optimized in the diameter of the tubing, the spacing between each revolution of the tubing, and the radius of the tubing.

FIG. 2B displays a schematic view of an alternative embodiment of a heating element 108 with the power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232. The embodiment of heating element 108 power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232 in FIG. 2B may comprise similar components found in the embodiment of heating element 108, power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232 found in FIG. 2B that may include, but is not limited to heating element 108, weather head 213, lifting plate 221, and heat shield 510 (FIG. 5B). In addition, baffles 505 may be positioned along the length of the heating portions of heating element 108 in order to keep the heating portions of heating element 108 organized and stabilized. It is noted that, in embodiments, the distance between lifting plate 221, heat shields 510 and baffles 505 may be optimized in the number and spacing distances.

FIG. 3 displays a sectional view of roof trusses 203 of a TES vessel 100. Each roof truss 203 may comprise top I-beam truss cord 302, a plurality of vertical and diagonal truss members 303, 304, and bottom I-beam truss cord 305. Roof trusses 203 may be positioned above roof 204 and may assist in reinforcing TES vessel 100 so that it can support the weight of the heating elements 108 and associated components. A secondary steel truss 301 may connect adjacent roof trusses 203 in a perpendicular manner above TES vessel 100 (spanning the width of TES vessel 100) in order to provide additional reinforcement. In embodiments, roof trusses 203 may comprise steel. The ceiling 207 and the roof 204 may incorporate a self-supporting elliptical design as shown in FIG. 2B. A column may be installed to support the elliptical ceiling.

Figure 4A:
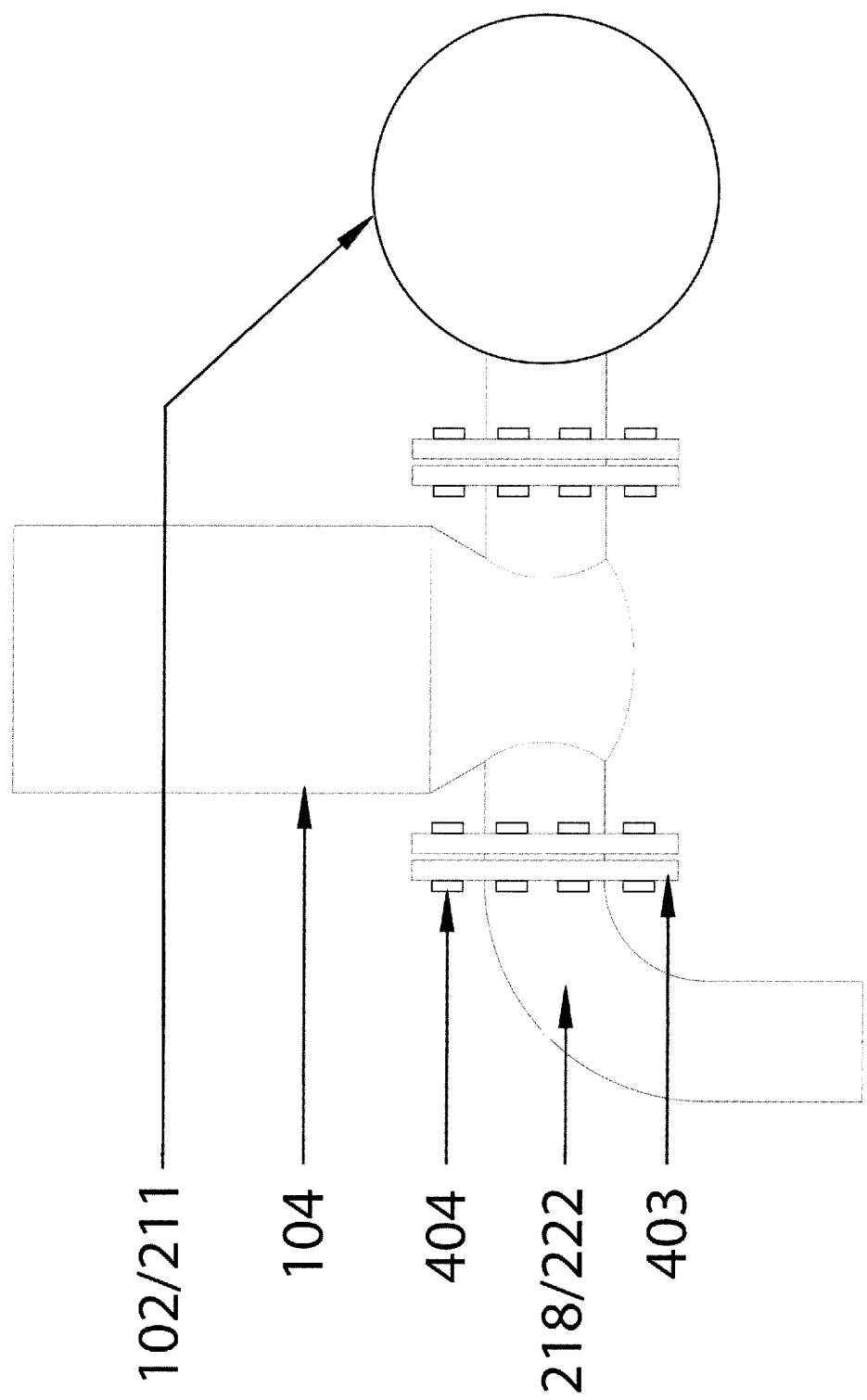
FIG. 4A displays a cross-sectional view of a power cycle working gas return header and power cycle working gas supply pipe header in accordance with embodiments.

FIG. 4A displays a cross-sectional view of a power cycle working gas return pipe header 102 and power cycle working gas supply header 211. As shown, valves 104 may be connected to power cycle working gas return pipe header 102 and to power cycle working gas supply pipe 211 via valve flange 403 that are connected with valve flange bolts 404. Power cycle working gas return tubing 218 and power cycle working gas supply tubing 222 are connected to the valve at the valve flange 403. Power cycle working gas 209 may pass through these elements when returning from steam turbine 1011 via power cycle working gas return pipe 101 (FIG. 10A); a compressor (for example, a rotary screw compressors) may need to be affixed to gas return pipe 101 in order to return power cycle working gas 209 to power cycle working gas return pipe header 102 (since power cycle working gas return pipe header 102 is located a certain distance above the ground).

Figure 4B:
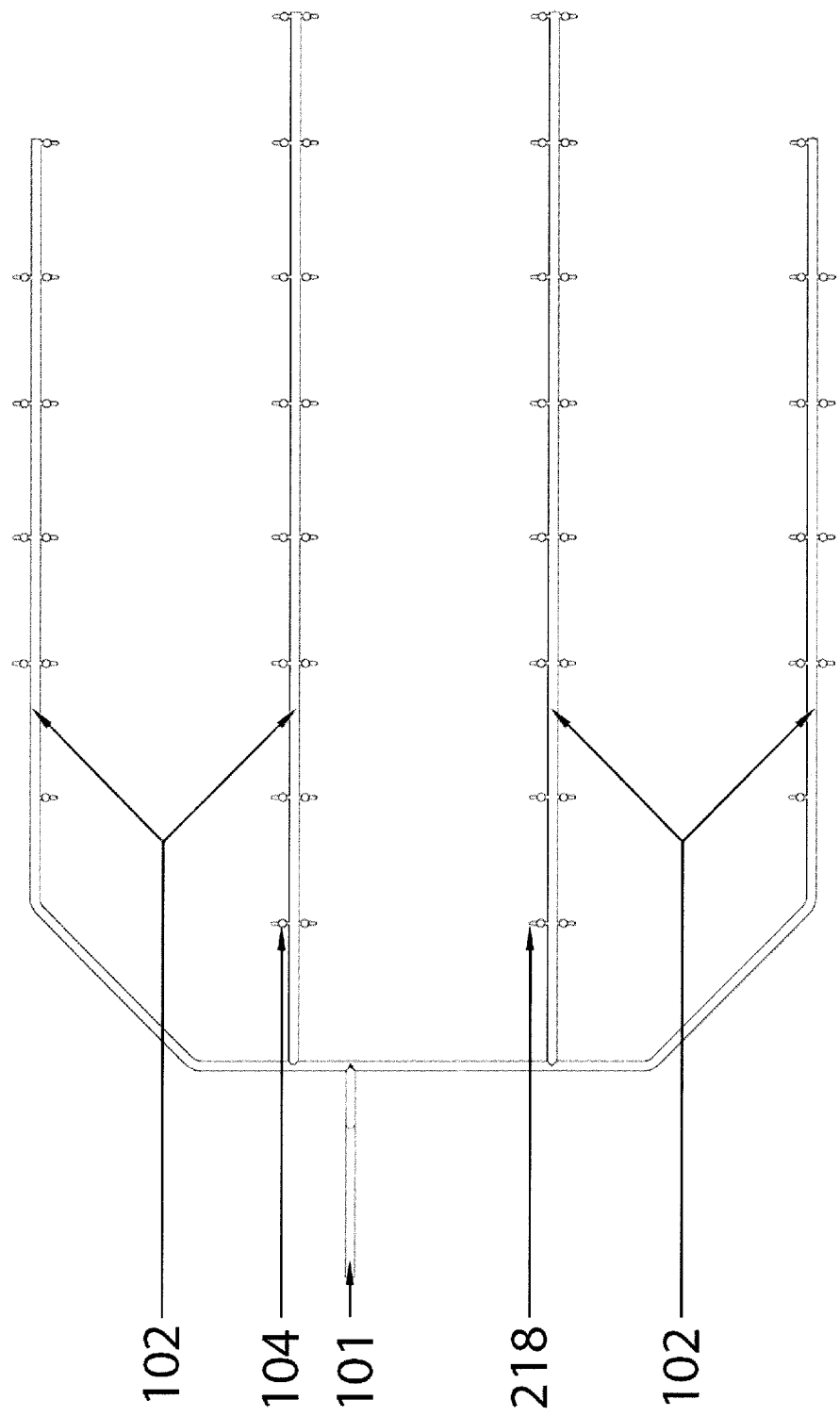
FIG. 4B displays a plan view of the power cycle working gas return pipe and power cycle working gas return header in accordance with embodiments.
Figure 10A:
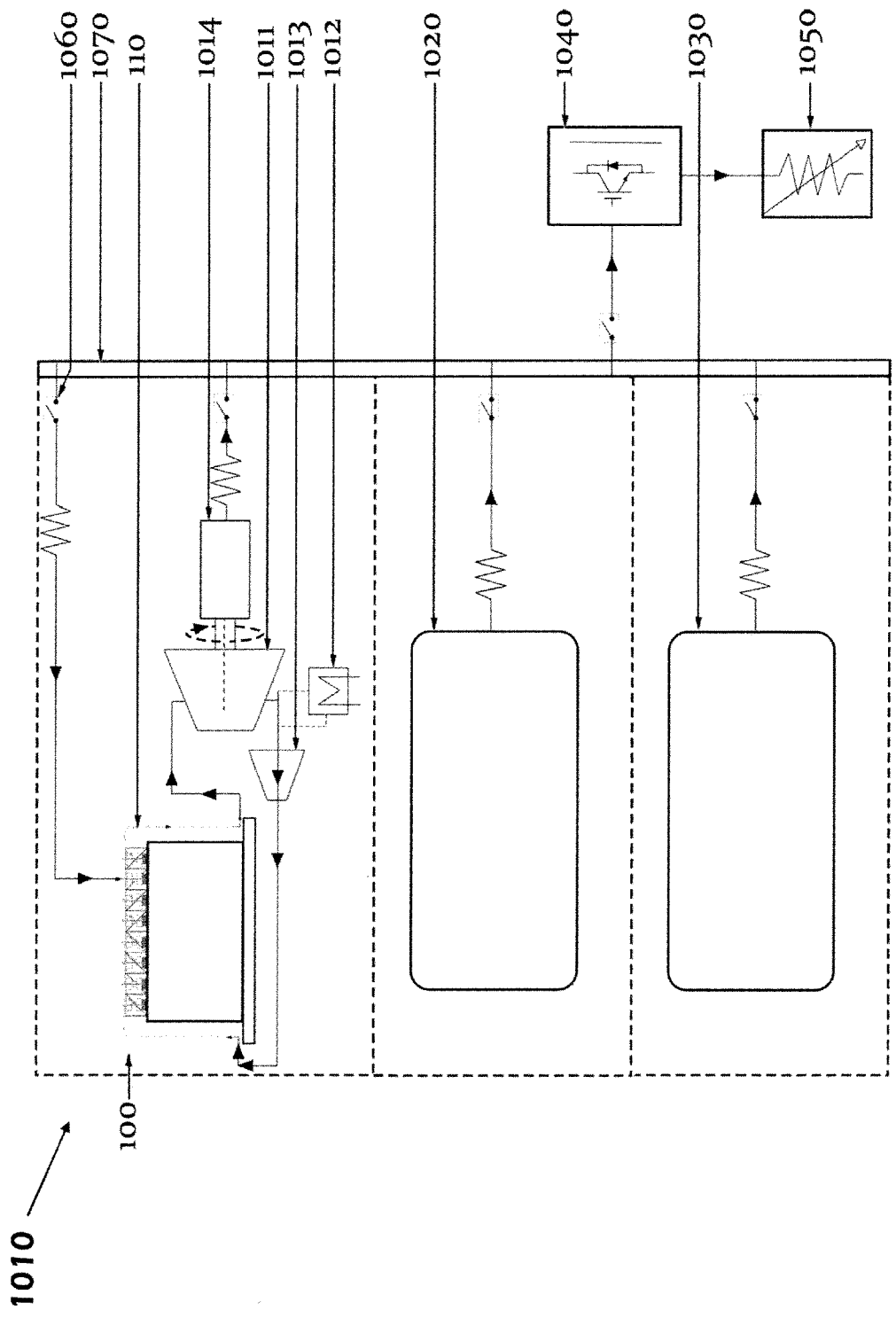
FIG. 10A displays a block diagram of an energy recovery system interfaced with renewable energy and conventional energy producers in accordance with embodiments.

FIG. 4B displays a plan view of a power cycle working gas return pipe header 102. As shown, a plurality valves 104 may be connected to power cycle working gas return pipe header 102. The power cycle working gas return tubing 218 is connected to the valve at the valve flange 403. Power cycle working gas 209 may pass through these elements when returning from steam turbine 1011 via power cycle working gas return pipe 101 (FIG. 10A).

Figure 4C:
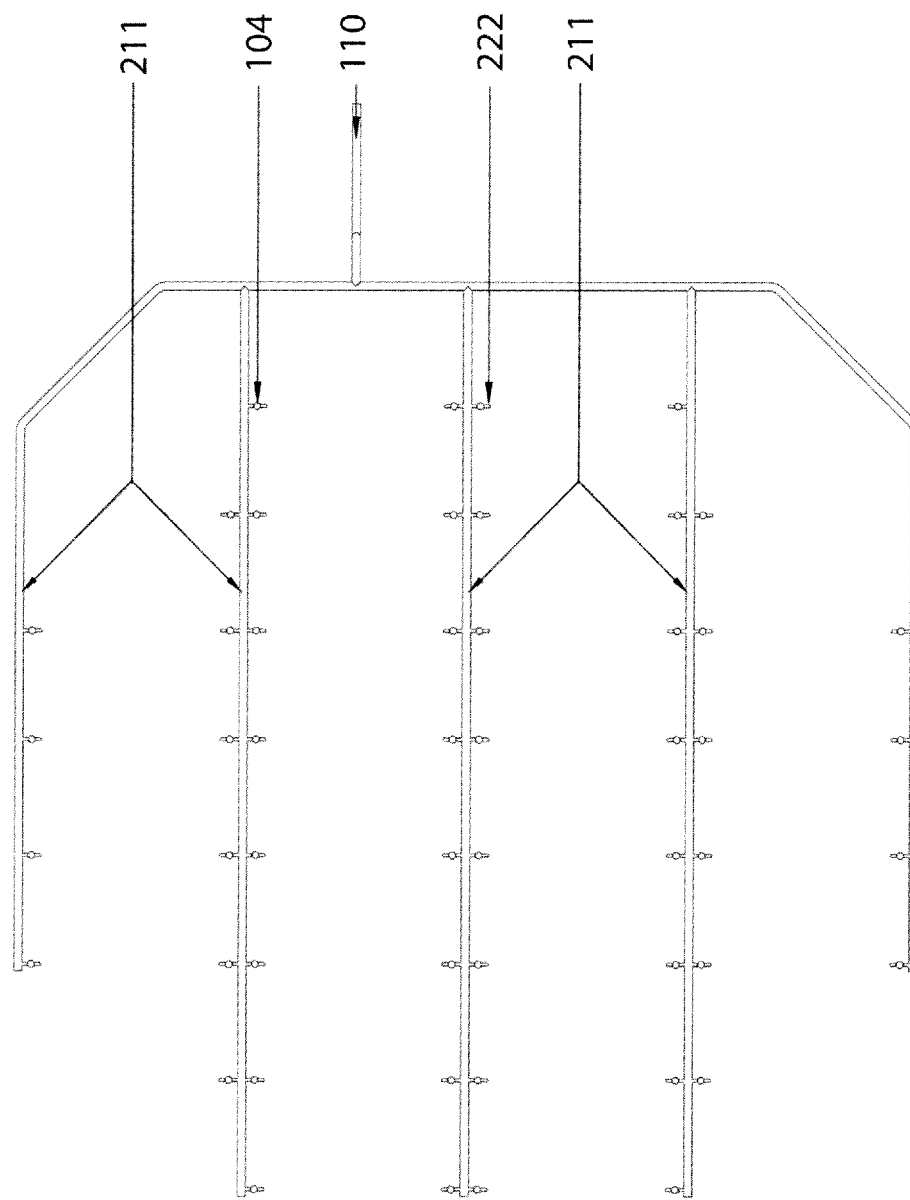
FIG. 4C displays a plan view of the power cycle working gas supply header in accordance with embodiments.

FIG. 4C displays a plan view of a power cycle working gas supply pipe header 211. As shown, a plurality valves 104 may be connected to power cycle working gas supply pipe header 211. The power cycle working gas supply tubing 222 is connected to the valve at the valve flange 403. Power cycle working gas 209 may pass through these elements when returning from steam turbine 1011 via power cycle working gas return pipe 101 (See FIG. 10A).

Figure 4D:
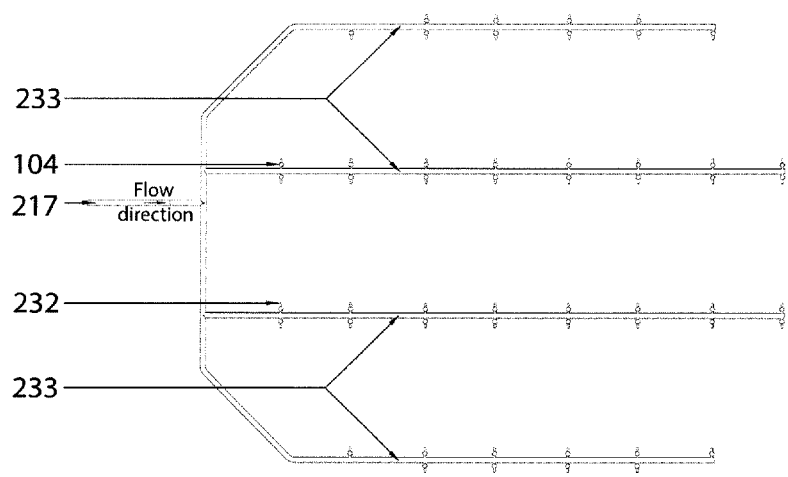
FIG. 4D displays a plan view of the power cycle working gas reheat discharge header in accordance with embodiments.

FIG. 4D displays a plan view of a power cycle working gas cold-reheat supply pipe header 233. As shown, a plurality valves 104 may be connected to power cycle working gas cold-reheat supply pipe header 233. The power cycle working gas reheat return tubing 232 is connected to the valve at the valve flange 403. Power cycle working gas 209 may pass through these elements when returning from steam turbine 1011 via power cycle working gas cold-reheat return pipe 217 (See FIG. 10B).

Figure 4E:
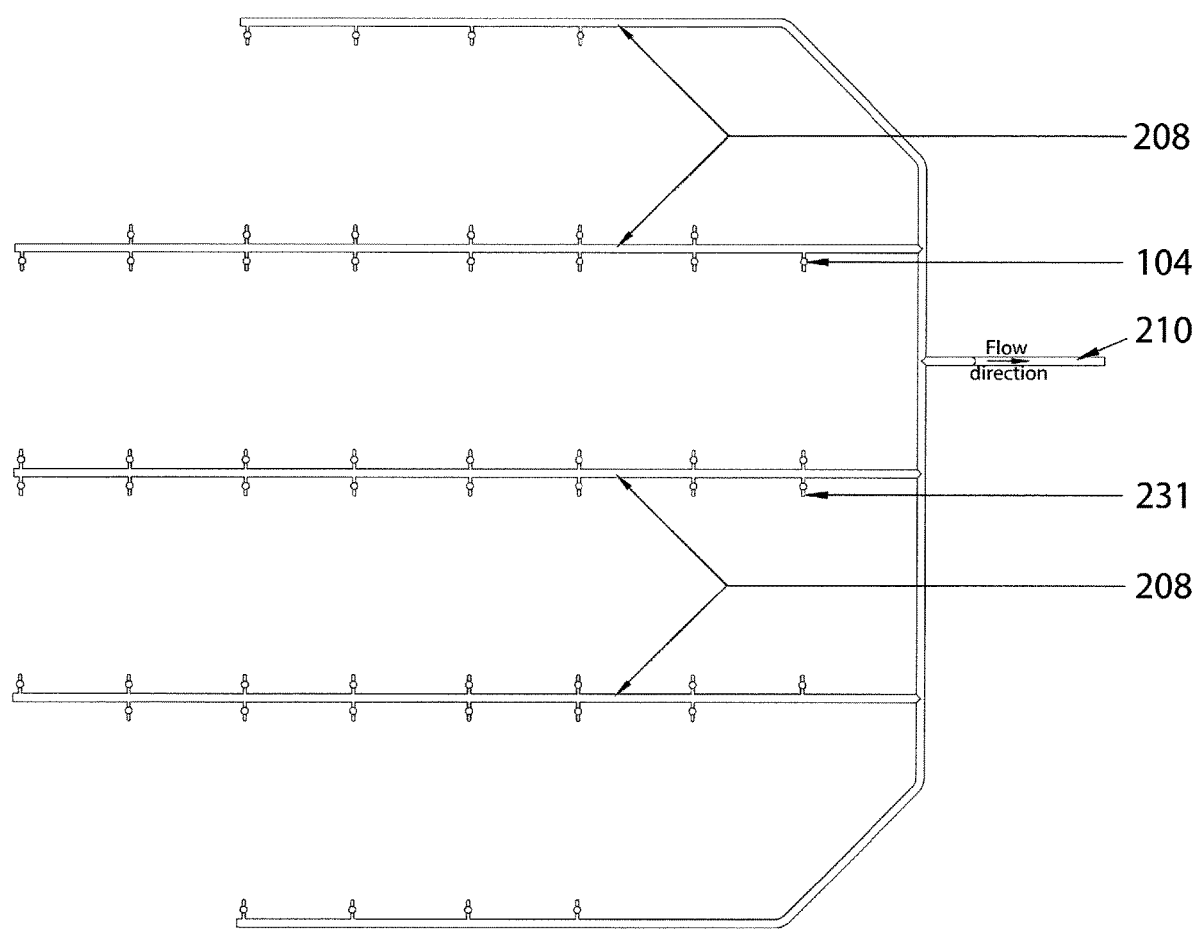
FIG. 4E displays a plan view of the power cycle working gas reheat charge header in accordance with embodiments.

FIG. 4E displays a plan view of a power cycle working gas reheat supply pipe header 208. As shown, a plurality valves 104 may be connected to power cycle working gas reheat supply pipe header 208. The power cycle working gas reheat supply tubing 231 is connected to the valve at the valve flange 403. Power cycle working gas 209 may pass through these elements when returning from steam turbine 1011 via power cycle working gas cold-reheat return pipe 217 and on route to the intermediate steam turbine 1015 via the reheat steam supply line 210 (FIG. 10A).

Figure 5A:
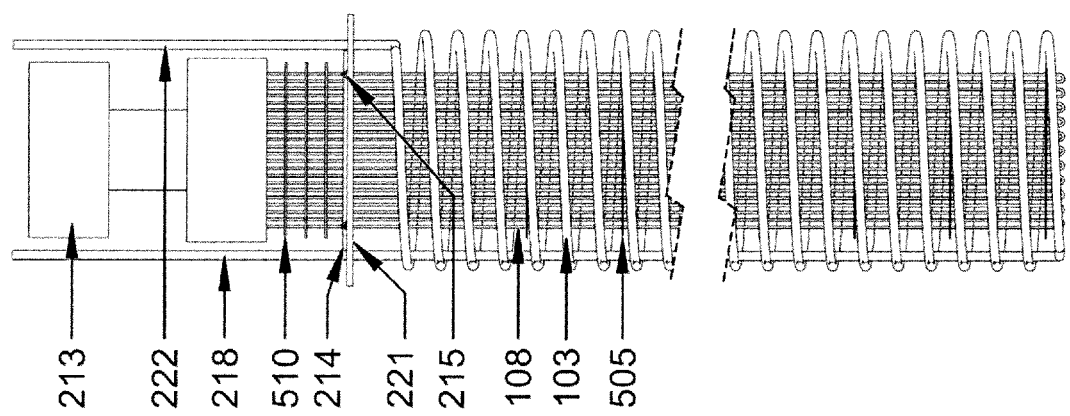
FIG. 5A displays a schematic view of an immersion heating element and heater tubing in accordance with embodiments.
Figure 5B:
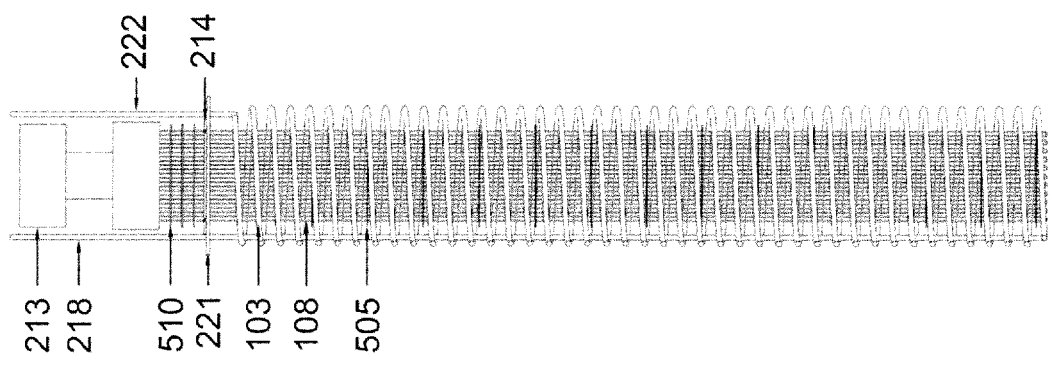
FIG. 5B displays a schematic view of an alternative embodiment of a heating element and power cycle working gas tubing in accordance with embodiments.

FIG. 5A displays a schematic view of a heating element 108 and power cycle working gas tubing 103. In this configuration, power cycle working gas tubing 103 is "coiled" around heating element 108, which allow the power cycle working gas tubing 103 to be exposed to the heated thermal storage fluid 109, allowing for the power cycle working gas 209 to absorb and retain an extensive amount of heat. It is noted that this configuration allows the power cycle working gas tubing 103 to be positioned adjacent to the heating element 108 without coming in direct contact with heating element 108 (except where power cycle working gas return tubing 218 and power cycle working gas supply tubing 222 pass through lifting plate 221. Flange 214 may be positioned/bolted on a top surface of lifting plate 221 and may provide additional reinforcement for holding the weight of heating element 108 and power cycle working gas tubing 103 as well as protection for weather head 213 and related components. Lifting rings 215 may also be positioned on the top surface of lifting plate 221 and may assist with the efficient removal of heating element 108 and power cycle working gas tubing 103 out of TES vessel 100.

In embodiments, heating element 108/power cycle working gas tubing 103 may comprise more than one of each of power cycle working gas return tubing 218 and power cycle working gas supply tubing 222. Each of the more than one of power cycle working gas return tubing 218 and power cycle working gas supply tubing 222 may be connected to valve 104 at valve flange 403.

It is noted that, in embodiments, the distance between the surface of lifting plate 221 closest to weather head 213 (top surface) and the bottom of weather head 213 may be 20 inches. In further embodiments, the distance between the top of weather head 213 to the bottom of heating element 108 may be 460.63 inches.

FIG. 5B displays a schematic view of an alternative embodiment of a heating element 108 and power cycle working gas tubing 103. The embodiment of heating element 108 and power cycle working gas tubing 103 in FIG. 5B may comprise similar components found in the embodiment of heating element 108 and power cycle working gas tubing 103 found in FIG. 5A that may include, but is not limited to power cycle working gas tubing 103, heating element 108, weather head 213, power cycle working gas return tubing 218, lifting plate 221, and power cycle working gas supply tubing 222. In addition, heat shields 510 may be positioned between weather head 213 and lifting plate 221 in order to protect weather head 213 and its components from high temperatures. In embodiments, heating element 108 may comprise three heat shields 510 that may be positioned and distanced evenly between weather head 213 and flange 214 (as an example, 4.5 inches between each heat shield 510, 4.5 inches from weather head 213 to adjacent heat shield 510, and 4.5 inches from flange 214 to adjacent heat shield 510). The position and distance from the weather head to shields 510 and baffles 505 may be optimized in the number and spacing distances.

Figure 5C:
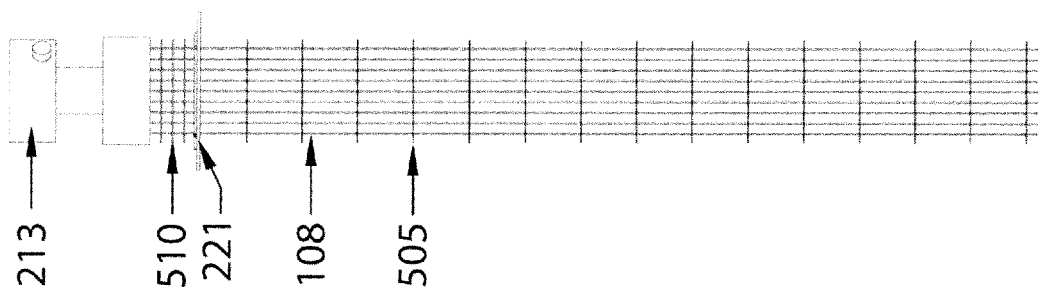
FIG. 5C displays a schematic view of an alternative embodiment of a heating element without a power cycle working gas tubing in accordance with embodiments.

FIG. 5C displays a schematic view of an alternative embodiment of a heating element 108 without a power cycle working gas tubing 103. The embodiment of heating element 108 and power cycle working gas tubing 103 in FIG. 5C may comprise similar components found in the embodiment of heating element 108 and power cycle working gas tubing 103 found in FIG. 5A that may include, but is not limited to heating element 108, weather head 213, lifting plate 221, and heat shield 510 (FIG. 5B). In addition, baffles 505 may be positioned along the length of the heating portions of heating element 108 in order to keep the heating portions of heating element 108 organized and stabilized. It is noted that, in embodiments, the distance between lifting plate 221 and adjacent baffle 505 may be 20 inches and the distance between adjacent baffles 505 may be 24 inches.

Figure 5D:
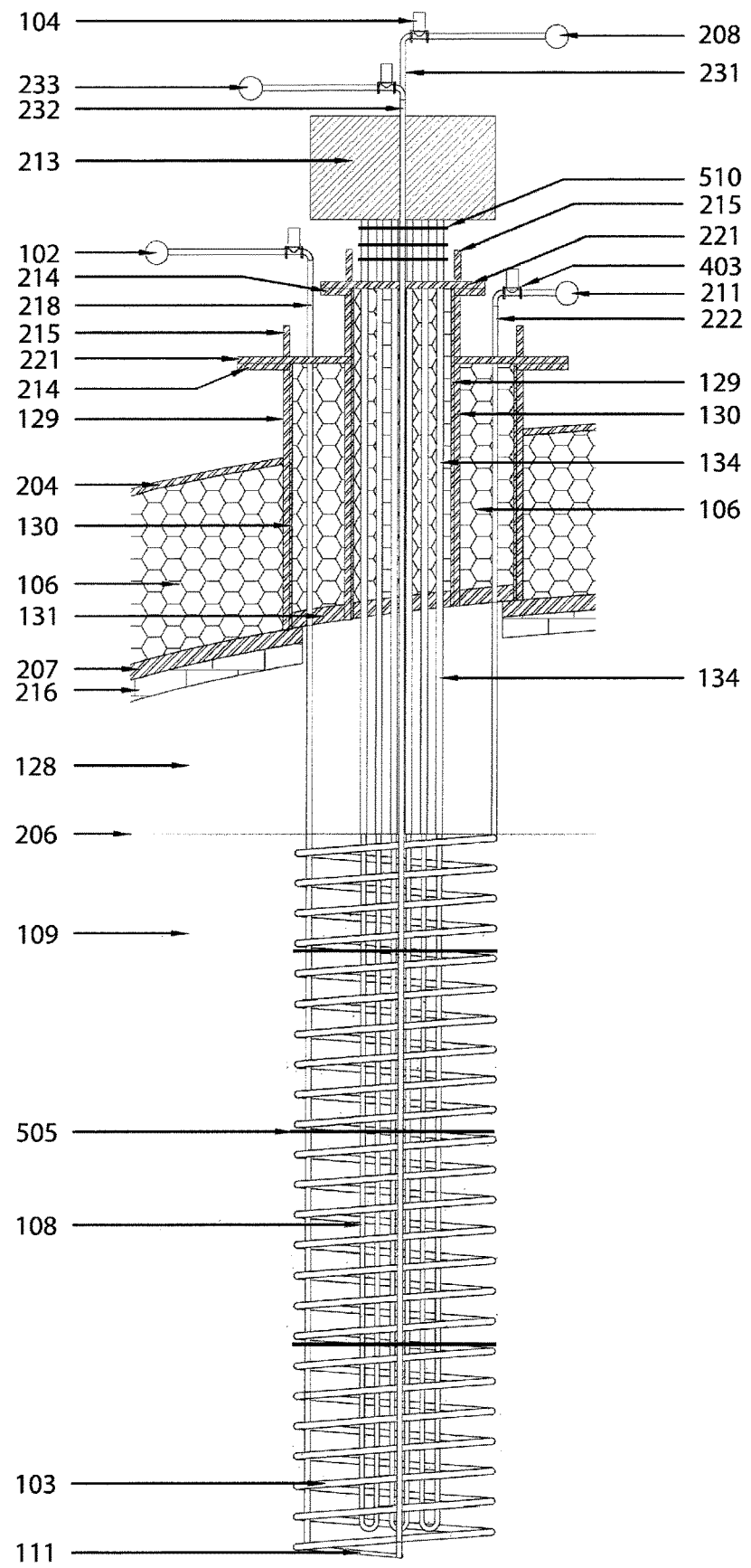
FIG. 5D displays a partial cross-sectional view of the insulated containment vessel self-supporting elliptical structure and a schematic view of a heating element and power cycle working gas tubing in accordance with embodiments.

FIG. 5D displays a partial cross-sectional view of an alternative embodiment of a thermal energy storage vessel 100 and a portion of components of an energy recovery system 1010. TES insulated containment vessel 100 may include an elliptical self-supporting exterior roof 204 and interior ceiling structure 207. The thermal storage fluid 109 is stored within the TES insulated containment vessel 100. The TES insulated containment vessel 100 may include an interior containment vessel and an outer shell 204. As shown in FIG. 5D, the outer shell may serve as the roof and sidewalls of the vessel. The interior containment vessel may include of a floor 219, ceiling 207, and walls that all such insulated containment vessel components are constructed with a cladding of stainless-steel liner with carbon steel and may be constructed with an alloy of stainless-steel that may be rolling-press cladding metallurgical bonded to carbon steel. A layer of ceramic 216 may be installed on the surface of the stainless-steel cladding. An insulation layer of ceramic wool 106 may be located between the ceiling 207 of the internal containment vessel and the roof 204 of the outer shell 204. Flanges 214 may be installed on top the roof 204 of the outer shell 204 with the base of the flange extending downward to the ceiling 207 of the interior insulated containment vessel and being open to the slosh area 128 of the interior insulated containment vessel below for receiving and mounting of equipment, instrumentation, and piping. The slosh area 128 is to accommodate the sloshing of the thermal energy fluid during a seismic activity and is located within the top portion of the interior insulated containment vessel. As such, the outer shell 204 may be constructed with carbon steel and may be covered with industrial coatings.

Power cycle working gas 209 may be pumped (see FIG. 2A) into TES vessel 100 through gas return pipe 101 connected to gas return pipe header 102 and valves 104. Once the power cycle working gas 209 passes the valves 104, it enters gas return tubing 218 and passes into the bottom of power cycle working gas tubing 103, where it is heated. The heated power cycle working gas 209 then exits power cycle working gas tubing 103 and enters gas supply tubing 222, where it then travels out of valves 104 in gas supply pipe header 211 and ultimately back to (in this case) steam turbine 1011 (see FIG. 10B) through gas supply pipe 110. In embodiments, power cycle working gas tubing 103, gas return tubing 218, gas supply tubing 222, and lifting flange 221 may exist as one contiguous, solitary component.

The cooled power cycle working gas 209 exits the high-pressure steam turbine (see FIG. 2A) through gas return cold-heat pipe 217 which is connected to gas return pipe header 233 and valves 104. Once the cooled power cycle working gas 209 passes the valves 104, it enters gas return tubing 232 and passes into the bottom of power cycle working gas tubing 111, where it is heated. The heated power cycle working gas 209 then exits power cycle working gas tubing 111 and enters gas supply tubing 231, where it then travels out of valves 104 in gas supply pipe header 233 to (in this case) intermediate-pressure steam turbine 1015 (see FIG. 10B) through reheat steam supply pipe 210. The power cycle working gas 209 then exits the intermediate-pressure steam turbine 1015 through gas supply tubing 210, where it then travels to the low-pressure steam turbine 1016 (see FIG. 10B). The power cycle working gas 209 then exits the low-pressure steam turbine 1015 and travels to the condenser 1012. The power cycle working gas 209 then exits the condenser 1012 and travels to the condensate storage tank 1018. The power cycle working gas 209 then exits the condensate storage tank 1018 and travels to the condensate pump 112, through the feedwater heater 113, to the deaerator 114. The power cycle working gas 209 then exits the deaerator 114, travels to feedwater pump 115, and then returns to TES vessel 100 to gas return pipe 101 (see FIG. 10B).

In embodiments, power cycle working gas tubing 103, gas return tubing 218, gas supply tubing 222, and lifting flange 221 may exist as one contiguous, solitary component.

Equipment, instrumentation, and piping penetrations may be made vertically through the roof of the outer shell 204 and the interior insulated containment vessel ceiling 207 to allow for maintenance services to be performed on the equipment, instrumentation, and piping without removing the thermal storage fluid 109 from the insulated containment vessel, or the need for a long-term disruption of, or discontinuing of, the operations of the TES system. This configuration is particularly beneficial for efficient operation.

The immersion heaters 213 may be affixed to a flange 214. Flange 214 may be a mounting flange, lifting flange, or both. The power cycle working gas return tubing 218, the power cycle working gas supply tubing 222, the power cycle working gas reheat supply tubing 231, and the power cycle working gas reheat return tubing 232 are affixed to a mounting/lifting flange 221. The flange 214 is affixed to the lifting flange 221 (See FIG. 7A and FIG. 7B). The immersion heaters 213, the power cycle working gas return tubing 218, the power cycle working gas supply tubing 222, the power cycle working gas reheat supply tubing 231, and the power cycle working gas reheat return tubing 232 may be installed vertically in an array around a molten salt vertical turbine pump 601, which may be affixed to a mounting flange 604 on the top of the outer shell 204 and penetrates downward into the heel of the insulated containment vessel. The immersion heaters 213, the power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232 are in thermal communication with the thermal storage fluid.

The power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232 may be optimized in the number of tubes, the position of the tubing in relationship to other tubing, the diameter of the tubing.

The power cycle working gas tubing 103, the power cycle working gas reheat tubing 111 may be optimized in the diameter of the tubing, in the number of revolutions made by the tubing, the spacing between each revolution of the tubing, and the radius of the tubing.

The power cycle working gas tubing 103 and the power cycle working gas reheat tubing 111 are "coiled" around heating element 108, which allow the power cycle working gas tubing 103 and the power cycle working gas reheat tubing 111 to be exposed to the heated thermal storage fluid 109, allowing for the power cycle working gas 209 to absorb and retain an extensive amount of heat. It is noted that this configuration allows the power cycle working gas tubing 103 and the power cycle working gas reheat tubing 111 are to be positioned adjacent to the heating element 108 without coming in direct contact with heating element 108 (except where power cycle working gas return tubing 218, power cycle working gas supply tubing 222, the power cycle working gas reheat supply tubing 231, and the power cycle working gas reheat return tubing 232 pass through lifting plate 221). Flange 214 may be positioned/bolted on a top surface of lifting plate 221 and may provide additional reinforcement for holding the weight of heating element 108, the power cycle working gas reheat supply tubing 231, and the power cycle working gas reheat return tubing 232 as well as protection for weather head 213 and related components. Lifting rings 215 may also be positioned on the top surface of lifting plate 221 and may assist with the efficient removal of heating element 108, the power cycle working gas tubing 103, the power cycle working gas tubing reheat tubing 111, the power cycle working gas reheat supply tubing 231, and the power cycle working gas reheat return tubing 232 out of TES vessel 100.

In embodiments, heating element 108, the power cycle working gas tubing 103, the power cycle working gas tubing reheat tubing 111, the power cycle working gas reheat supply tubing 231, and the power cycle working gas reheat return tubing 232 may comprise more than one of each. Each of the more than one of the power cycle working gas tubing 103, the power cycle working gas tubing reheat tubing 111, the power cycle working gas reheat supply tubing 231, and the power cycle working gas reheat return tubing 232 may be connected to valve 104 at valve flange 403.

FIG. 5D displays a schematic view of an alternative embodiment of a heating element 108 with the power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232. The embodiment of heating element 108 power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232 in FIG. 2B may comprise similar components found in the embodiment of heating element 108, power cycle working gas return tubing 218, the power cycle working gas supply tubing 222, the power cycle working gas tubing 103, the power cycle working gas tubing reheat tubing 111, the power cycle working gas reheat supply tubing 231, and the power cycle working gas reheat return tubing 232 found in FIG. 2B that may include, but is not limited to heating element 108, weather head 213, lifting plate 221, and heat shield 510 (FIG. 5B). In addition, baffles 505 may be positioned along the length of the heating portions of heating element 108 in order to keep the heating portions of heating element 108 organized and stabilized. It is noted that, in embodiments, the distance between lifting plate 221, heat shields 510 and baffles 505 may be optimized in the number and spacing distances.

Figure 6B:
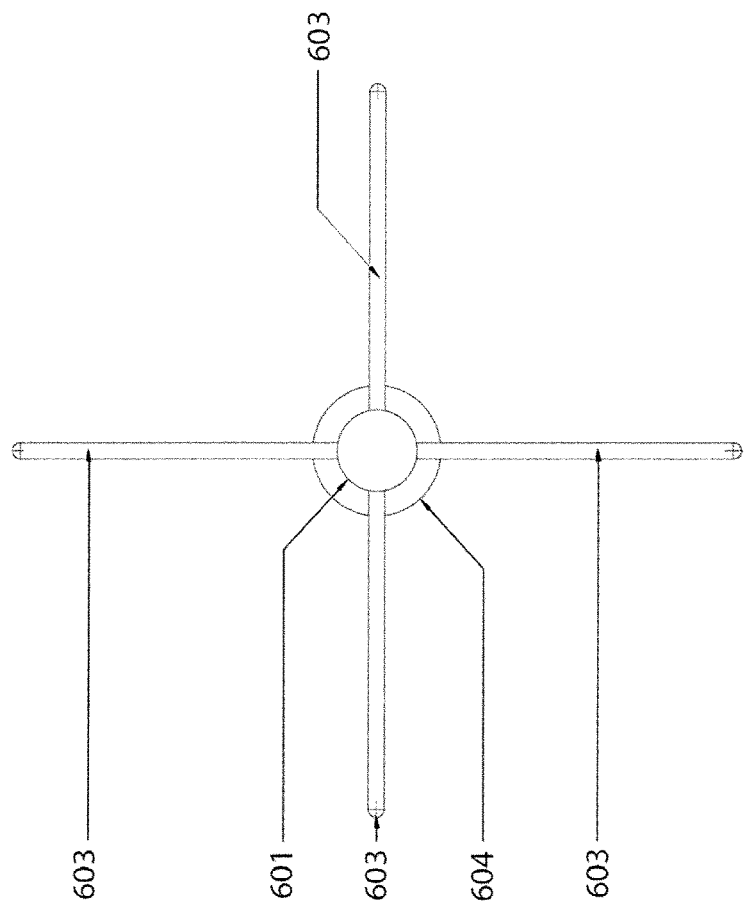
FIG. 6B displays a top view of a vertical turbine pump in accordance with embodiments.
Figure 6A:
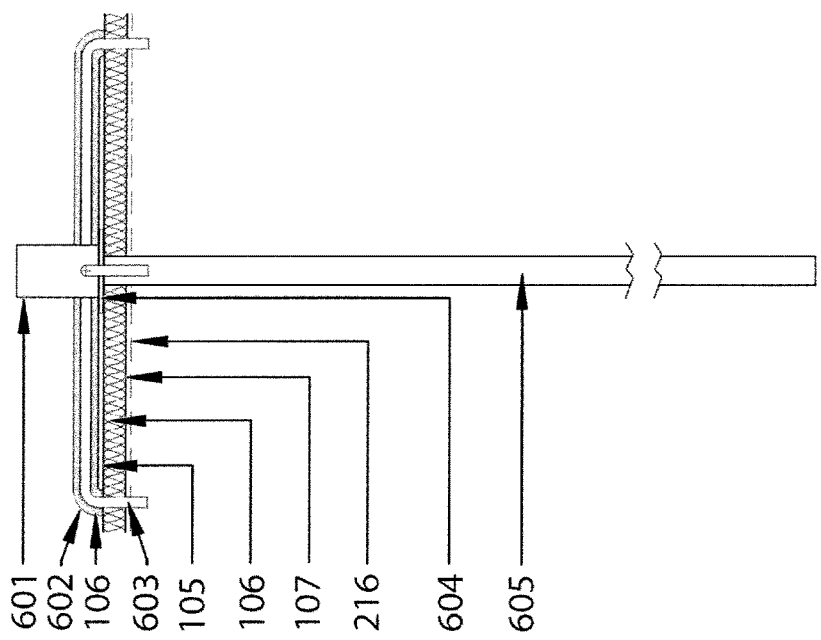
FIG. 6A displays a side view of a vertical turbine pump in accordance with embodiments.

FIG. 6A displays a side view of a vertical turbine pump 601. As shown, vertical turbine pump 601 may include distribution piping 603, flange 604, and pump column and shaft assembly 605. The distribution piping 603 may be encased with a layer of aluminum jacketing 602. A thermal insulation layer 106 may be between the distribution piping 603 and the aluminum jacketing layer 602.

FIG. 6B displays a plan view of a vertical turbine pump 601. As shown, vertical turbine pump 601 may include distribution piping 603, and flange 604.

Figure 6C:
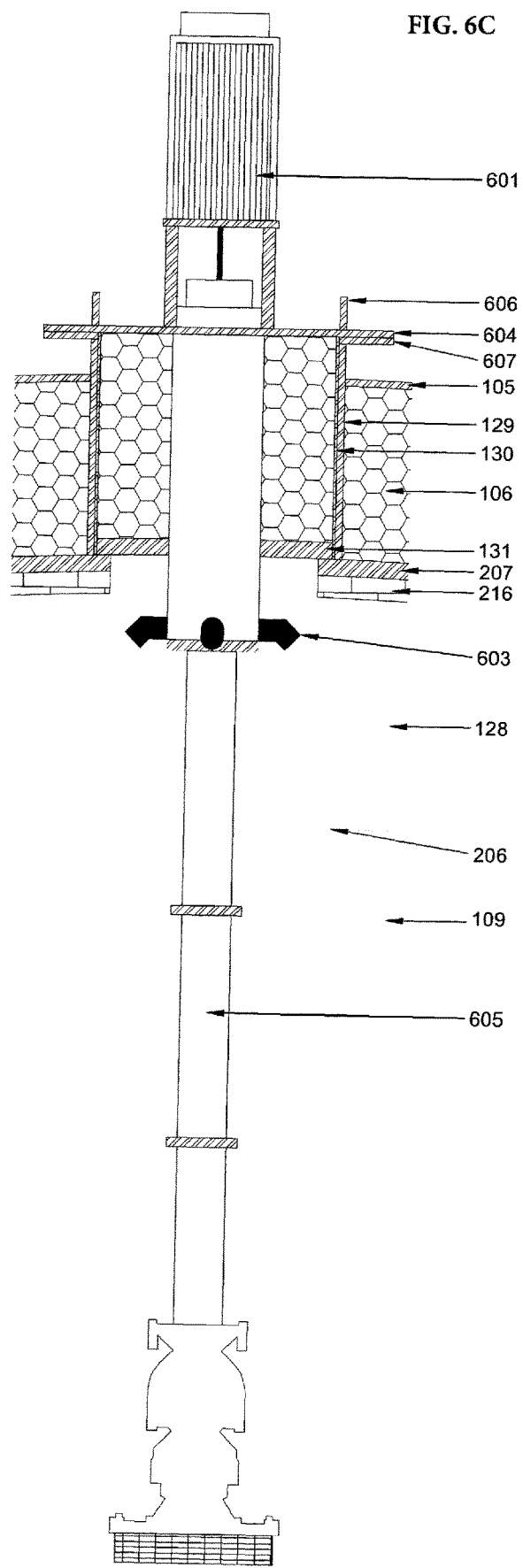
FIG. 6C displays the side view of a vertical turbine pump with the pump's discharge head located within the confinement of the vessel in accordance with embodiments.

FIG. 6C displays a side view of a vertical turbine pump 601 with the vertical turbine pump's discharge head 603 located within the confinement of the vessel. The vertical turbine pump 601 may be mounted on flange 604. The portion of the vertical turbine pump 601 above the discharge head may be encased with 0.25" sidewall housing shell plate 130, flange 604 on top, and 1.50" housing baseplate 131 and filled with ceramic wool insulation 106. The vertical turbine pump 601 is utilized to relocate the thermal storage fluid 109 from the bottom of the containment vessel to the top of the column of the thermal storage fluid 109 to create turbulence within the thermal storage fluid 109, thereby reducing thermal stratification in the thermal storage fluid 109 and increasing the system's overall efficiency rating during the energy recovery and charging cycles.

Figure 7A:
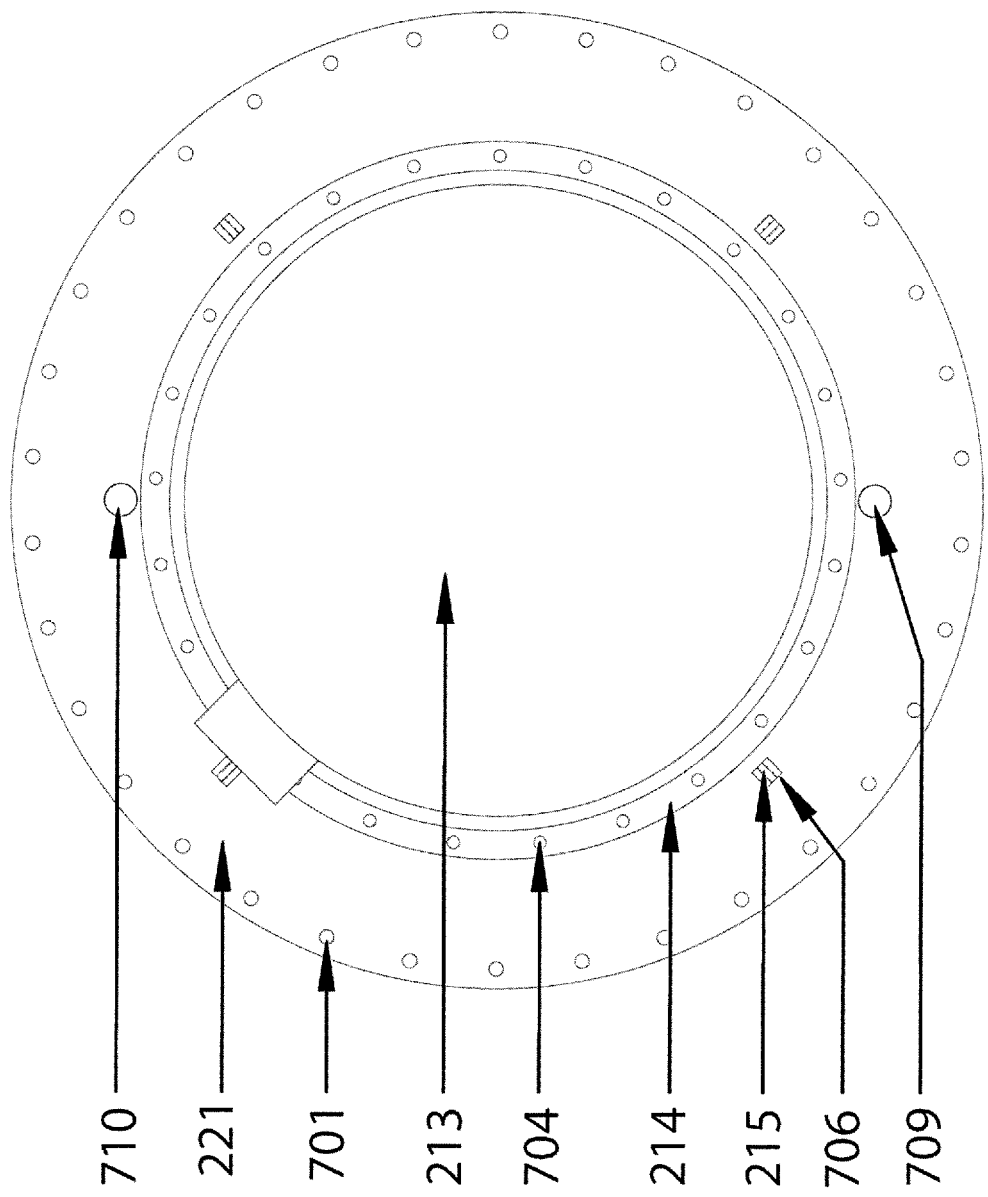
FIG. 7A displays a top view of a lifting flange and associated features in accordance with embodiments.

FIG. 7A displays a top view of a lifting plate 221 of a heating element 108, power cycle working gas tubing 103 and associated features. Lifting plate 221 is affixed to roof 204 via a plurality of lifting plate bolts 701. Flange 214 is positioned on top of lifting plate 221 and is affixed via flange bolts 704. Power cycle working gas return tubing 218 and power cycle working gas supply tubing 222 extend through opposite sides of lifting plate 221 via orifices (referred to as gas return pipe orifice 709 and gas supply pipe orifice 710) so that power cycle working gas tubing 103 and heating element 108 may be positioned/moved as a single unit. Weather head 213 may be positioned at the center of lifting plate 221 and flange 214 and may align with heating element 108. Lifting rings 215 may be affixed to lifting plate 221 via corresponding base plates 706 and may be positioned adjacent the circumference of lifting plate 221/flange 214. As shown, the lifting rings 215 and base plates 706 are positioned roughly 90 degrees apart so that heating element 108 and power cycle working gas tubing 103 is removed efficiently and easily (using equipment such as a crane) when heating element 108 and power cycle working gas tubing 103 is removed from TES vessel 100. In embodiments, each of the power cycle working gas return pipe orifice 709 and gas supply pipe orifice 710 may comprise a diameter of 2.3 inches, the distance (latitudinally) between the midpoint of lifting plate 221 and the midpoint of gas return pipe orifice 709 (and also between the midpoint of lifting plate 221 and the midpoint of gas supply pipe orifice 710) may be 32 inches, the thickness of lifting plate 221 may be 1.5 inches, and/or the distance (in degrees) between adjacent lifting plate bolts 701 may be 10.59 degrees.

Figure 7B:
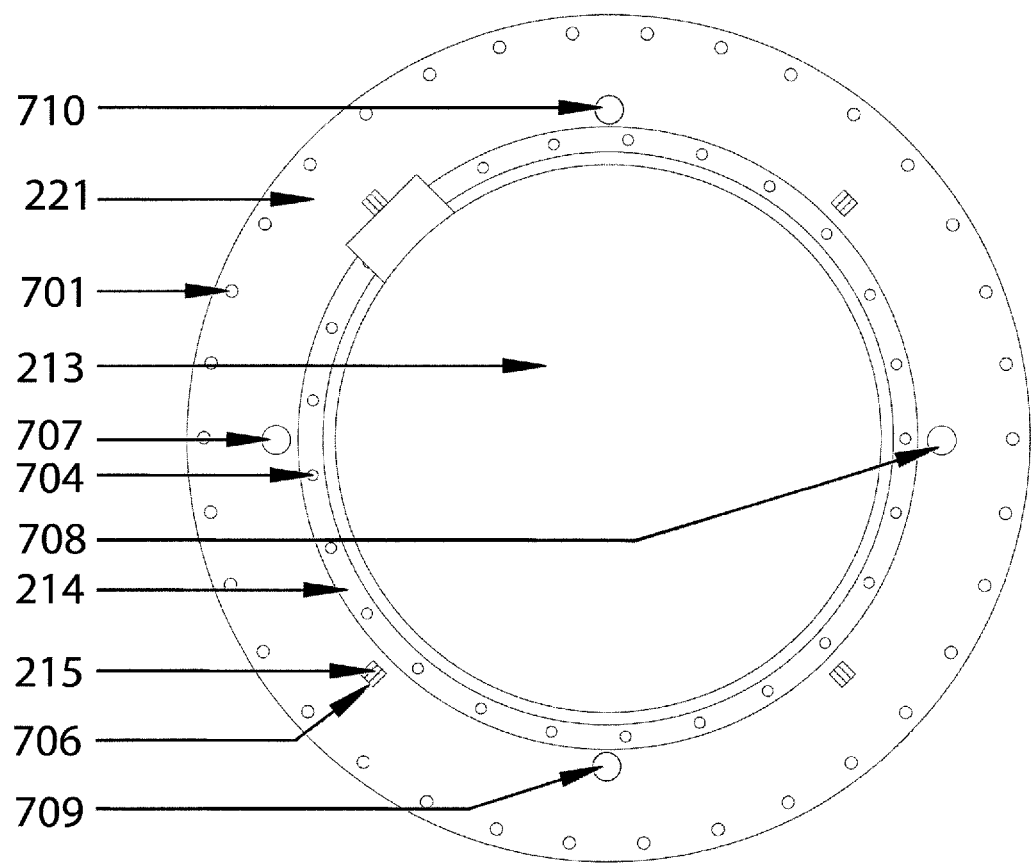
FIG. 7B displays a top view of a lifting flange including orifices for reheat tubing.

FIG. 7B displays a top view of a lifting flange including orifices for reheat tubing.

Figure 8B:
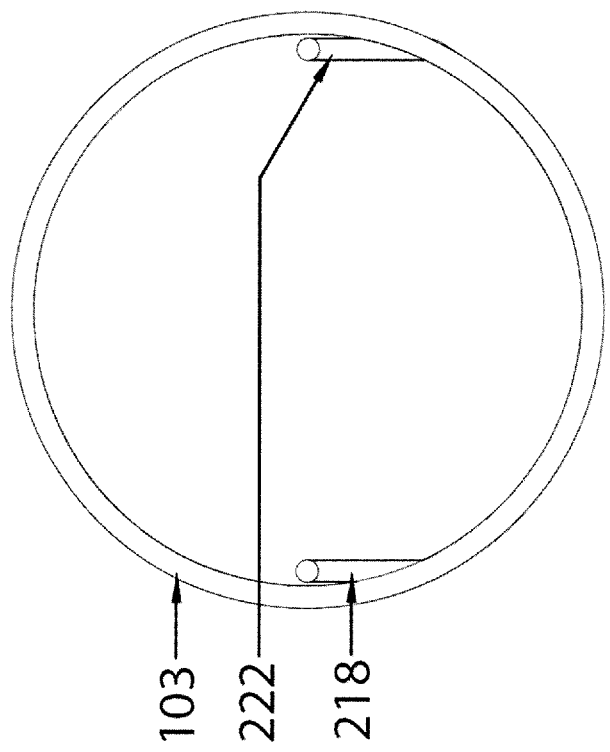
FIG. 8B displays a top view of power cycle working gas tubing in accordance with embodiments.
Figure 8A:
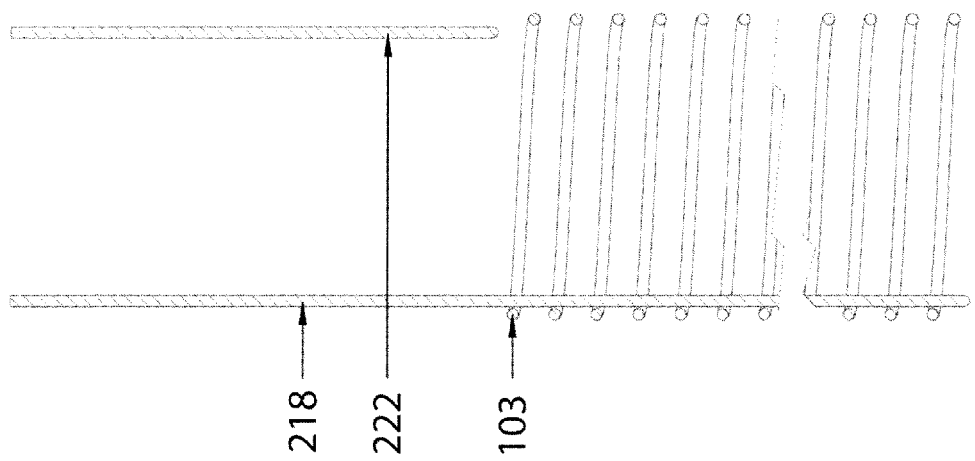
FIG. 8A displays a partial cross-sectional view of a heating element and power cycle working gas tubing in accordance with embodiments.

FIG. 8A displays a partial cross-sectional view of a power cycle working gas tubing 103. Power cycle working gas tubing 103 is shown positioned adjacent and outside the bounds of power cycle working gas return tubing 218 and power cycle working gas supply tubing 222. This embodiment of having the power cycle working gas tubing 103, power cycle working gas return tubing 218, and power cycle working gas supply tubing 222 directly adjacent one another may provide efficiency in the manufacturing of the power cycle working gas tubing 103, power cycle working gas return tubing 218, and power cycle working gas supply tubing 222. In embodiments, the distance between the center point of the circumference of power cycle working gas tubing 103 and the center point of the circumference of power cycle working gas return tubing 218 (and gas supply tubing 222) may be 26.375 inches in length, the inner diameter of power cycle working gas return tubing 218 and gas supply tubing 222 may be ⅝ inches, the outer diameter of gas return tubing 218 and power cycle working gas supply tubing 222 may be ⅝ inches, and the distance between the center point of the circumference of power cycle working gas tubing 103 and the midpoint of the width of the actual tubing of power cycle working gas tubing 103 may be 58 inches.

FIG. 8B displays a top view of the power cycle working gas tubing 103. Power cycle working gas tubing 103 is shown outside the bounds positioned adjacent and outside the bounds of power cycle working gas return tubing 218 and power cycle working gas supply tubing 222. This embodiment of having the power cycle working gas tubing 103, power cycle working gas return tubing 218, and power cycle working gas supply tubing 222 directly adjacent one another may provide efficiency in the manufacturing of the power cycle working gas tubing 103, power cycle working gas return tubing 218, and power cycle working gas supply tubing 222. In embodiments, the distance between the centerpoint of the circumference of power cycle working gas tubing 103 and the centerpoint of the circumference of power cycle working gas return tubing 218 (and gas supply tubing 222) may be 26.375 inches in length, the inner diameter of power cycle working gas return tubing 218 and gas supply tubing 222 may be 2 inches, the outer diameter of gas return tubing 218 and power cycle working gas supply tubing 222 may be 2.25 inches, and/or the distance between the centerpoint of the circumference of power cycle working gas tubing 103 and the midpoint of the width of the actual tubing of power cycle working gas tubing 103 may be 58 inches.

Figure 8C:
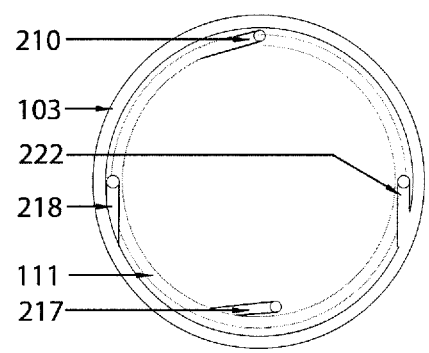
FIG. 8C displays a top view of power cycle working gas tubing and reheat tubing in accordance with embodiments.

FIG. 8C displays a top view of the thermal conductive helical coiled tubing heat exchanger 103, the associated working gas return tubing 218 (charge side), the associated working gas supply tubing 222 (discharge side) and the thermal conductive helical coiled tubular heat exchanger reheater 111, the associated working gas reheat tubing 217 (charge side) and the associated working gas reheat supply line 210.

Figure 8D:
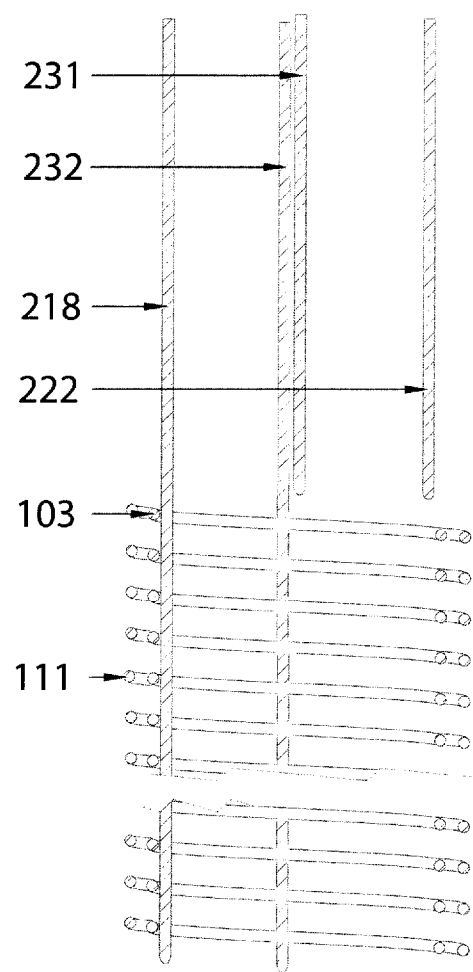
FIG. 8D displays a front view of power cycle working gas tubing and reheat tubing in accordance with embodiments.

FIG. 8D displays the front view of the thermal conductive helical coiled tubing heat exchanger 103, the associated working gas return tubing 218 (charge side), the associated working gas supply tubing 222 (discharge side) and the thermal conductive helical coiled tubular heat exchanger reheater 111, the associated working gas reheat tubing 217 (charge side) and the associated working gas reheat supply line 210.

FIG. 9A displays a top view of a heat shield 510 including heat shield orifices 910. heat shield 510, as shown, includes 41 heat shield orifices 910 that may keep separate heating portions of heating element 108 organized and stabilized and to protect mechanical equipment associated with heating element/weather head 213. In embodiments, the distance (longitudinally) between the midpoints of heat shield orifices 910 in adjacent rows may be 4.56 inches, the distance between the midpoints of heat shield orifices 910 in a pair may be 1.8225 inches, the distance (latitudinally) between the midpoints of first heat shield orifices 910 (in a pair) in adjacent pairs may be 7.29 inches, the distance (latitudinally) between the midpoints of second heat shield orifices 910 (in a pair) in adjacent pairs may be 7.29 inches, the diameter of each heat shield orifice 910 may be 0.65 inches, the diameter of heat shield 510 may be 44 inches, and/or the thickness of heatshield 510 may be 0.25 inches.

FIG. 9B displays a top view of a baffle 505 including baffle orifices 905. Baffle 505, as shown, includes 41 baffle orifices 905 that may keep separate heating portions of heating element 108 organized and stabilized and to protect mechanical equipment associated with heating element/weather head 213. In embodiments, the distance (longitudinally) between the midpoints of baffle orifices 905 in adjacent rows may be 4.56 inches, the distance between the midpoints of baffle orifices 905 in a pair may be 1.8225 inches, the distance (latitudinally) between the midpoints of first baffle orifices 905 (in a pair) in adjacent pairs may be 7.29 inches, the distance (latitudinally) between the midpoints of second baffle orifices 905 (in a pair) in adjacent pairs may be 7.29 inches, the diameter of each baffle orifice 905 may be 0.65 inches, the diameter of baffle 505 may be 44 inches, and/or the thickness of baffle 505 may be 0.50 inches.

FIG. 9C displays a top view of a flange 214 including flange orifices 915. Flange 214, as shown, includes 41 flange orifices 915 that may keep separate heating portions of heating element 108 organized and stabilized and to protect mechanical equipment associated with heating element/weather head 213. In embodiments, the distance (longitudinally) between the midpoints of flange orifices 915 in adjacent rows may be 4.56 inches, the distance between the midpoints of flange orifices 915 in a pair may be 1.82 inches, the distance (latitudinally) between the midpoints of first flange orifices 915 (in a pair) in adjacent pairs may be 7.29 inches, the distance (latitudinally) between the midpoints of second flange orifices 915 (in a pair) in adjacent pairs may be 7.29 inches, the diameter of each flange bolt orifice 920 may be 0.875 inches, the diameter of flange 214 may be 50 inches, the distance from the midpoint of a flange bolt orifice 920 to its antipodal midpoint may be 48 inches, the distance (in degrees) between adjacent flange bolt orifice 920 midpoints may be 14.4 degrees, and/or the thickness of flange 214 may be 1 inch.

FIG. 10A displays a block diagram of an energy recovery system 1010 interfaced with renewable energy producers. TES vessel 100 may be electrically connected to a breaker 1060 and an energy exchange interface 1070 (for example, a DC bus), which may electrically connect TES vessel 100 to a plurality of renewable energy producers such as, but not limited to renewable power system 1020. Once TES vessel 100 receives electricity, it is converted into heat via heating elements 108 and transferred to a power cycle working gas 209 (for example, steam) sent through power cycle working gas tubing 103 surrounding the heating elements 108. It is noted that the heat from the heating elements 108 is transferred to a thermal storage fluid 109 for storage until the heat is absorbed by the power cycle working gas 209. Power cycle working gas 209 may then be sent to turbine 1011 (which in this case is a steam turbine) where the steam is converted into rotational energy, which is then converted into electricity via generator 1014. Generator 1014, electrically connected to energy exchange interface 1070, sends the electricity to energy exchange interface 1070, where it may be sent to PWM (pulse width modulation) inverter 1040 and subsequently to grid supply 1050. Condenser 1012 and compressor 1013 may be utilized to collect the steam processed in turbine 1011 so that it may be utilized again by the TES vessel 100/energy recovery system 1010.

Renewable energy systems 1020 may convert electricity to the proper voltage, the electricity may be sent to energy exchange interface 1070 and subsequently sent to either one of TES vessel 100 or to a PWM inverter 1040 and then to grid supply 1050.

Conventional energy system 1030 may convert a fuel source into electricity, and is electrically connected to energy exchange interface 1070, sends the electricity to energy exchange interface 1070, where it may be sent to PWMPWM inverter 1040 and subsequently sent to either one of TES vessel 100 or to a PWMPWM inverter 1040 and then to grid supply 1050.

It is noted that breakers 1060 may be positioned within the electrical connections between energy exchange interface 1070 and TES vessel 100, generator 1014 of TES vessel 100 and energy exchange interface 1070, renewable energy systems 1020, conventional energy systems and energy exchange interface 1070, and PWM inverter 1040.

Figure 10B:
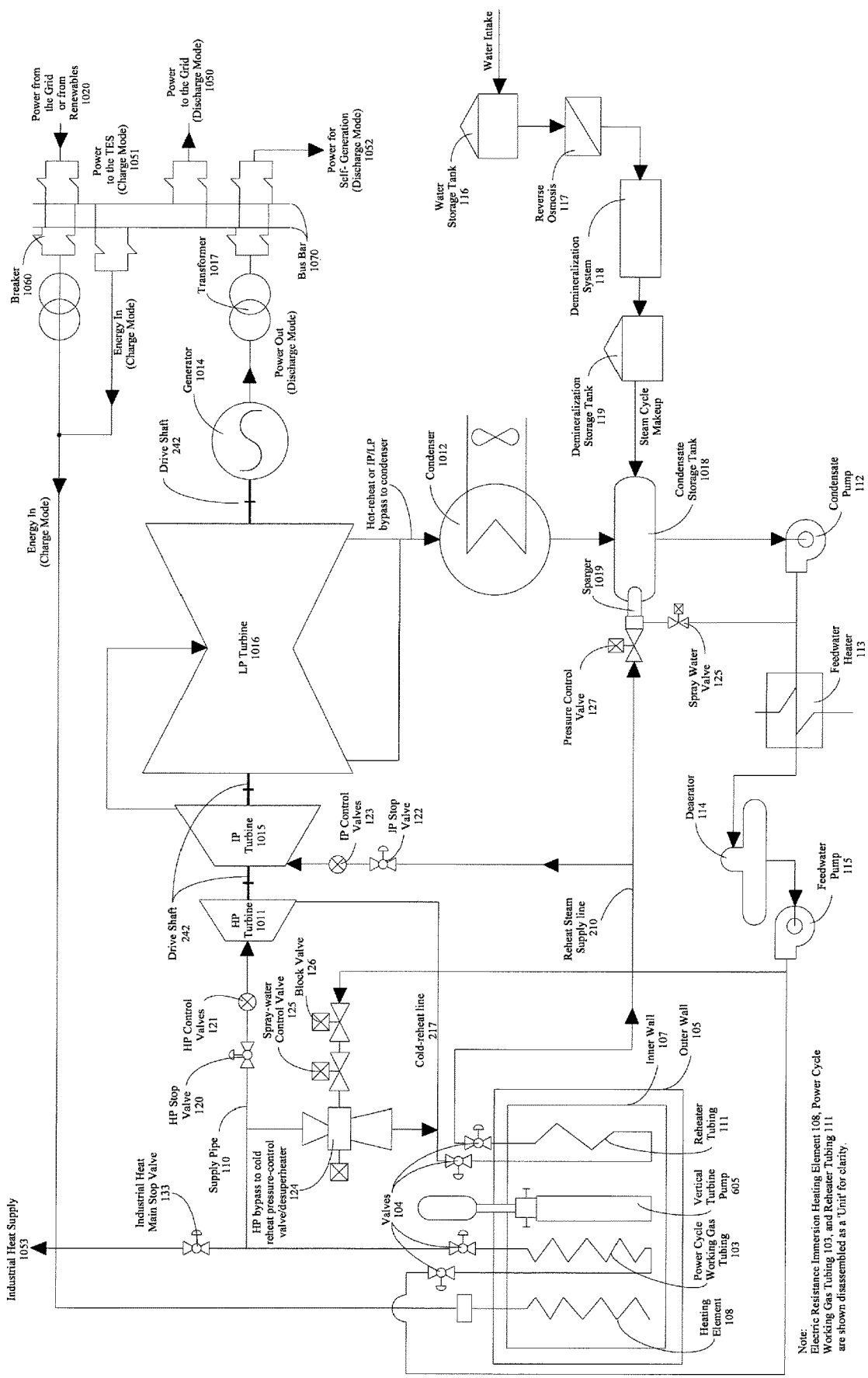
FIG. 10B displays a block diagram of an energy recovery system interfaced with renewable energy and conventional energy producers with industrial heat provision in accordance with embodiments.

The renewable energy sources may include, but are not limited to solar energy, wind energy, biomass, hydropower, and geothermal energy. For example, renewable energy sources 1020 are represented in FIGS. 10A-B. Conventional energy sources 1030 may include, but not limited to coal, natural gas, and petroleum fuels. For example, conventional energy sources are represented in FIGS. 10A-B.

FIG. 10B displays a flow diagram of an energy recovery system 1010 interfaced with renewable energy producers. TES vessel 100 may be electrically connected to a breaker 1060 and an energy exchange interface 1070 (for example, a DC bus), which may electrically connect TES vessel 100 to a plurality of renewable energy producers such as, but not limited to renewable power system 1020.

Once TES vessel 100 receives electricity, the electricity is converted into sensible heat via heating elements 108 (charging regime) and transferred to a power cycle working gas 209 (for example, steam) sent through power cycle working gas tubing 103 surrounding the heating elements 108. It is noted that the heat from the heating elements 108 is transferred to a thermal storage fluid 109 for storage until the heat is absorbed, partially or completely, by the power cycle working gas 209. Power cycle working gas 209 (discharging regime) may then be sent in the first stage to a high-pressure turbine 1011 (which in this case is a steam turbine) where the steam is converted into rotational energy, which is then converted into electricity via generator 1014. Generator 1014, electrically connected to energy exchange interface 1070 to subsequently dispatch electricity to the power grid as grid supply 1050, or for partial charging of the TES system 1051, or for self-generation 1052. The following steps are provided as one embodiment, though alternatives may be considered, wherein an alternative embodiment may include duplicate steps, remove steps, or combine steps.

In the first stage, high-pressure steam may be admitted into the high-pressure turbine 1011 by the main stop 120 and control valves 121. Steam exhaust from the high-pressure turbine 1011 may be returned to the TES vessel 100 via the cold-reheat line 217. The steam exhaust enters the charge side of the reheater tubing 111. The steam may be reheated and then exits TES vessel 100 via the reheat supply line 210. In the second stage, reheated steam may be admitted to the intermediate-pressure turbine 1015 via the reheat intermediate stop 122 and interceptor valves 123. Steam directly from the intermediate-pressure turbine outlets enters at least one low-pressure turbine 1016 steam chamber and exhaust from the end of the low-pressure turbine 1016 into the main condenser 1012. After leaving the low-pressure turbine, the power cycle working gas may be directed to the condenser 1012 to convert the power cycle working gas back into cooled condensed water to be subsequently stored in the condensate storage tank 1018 until the cooled condensate water is called for delivery back to the TES vessel 100 to be recharged. The condensed water may be supplied to the deaerator 114 by passing through the low-pressure feedwater heater(s) from the condensate pump 112. The feedwater pump 115 pumps the heated condensate water from the deaerator 114 to the TES vessel 100 to be recharged.

Figure 10C:
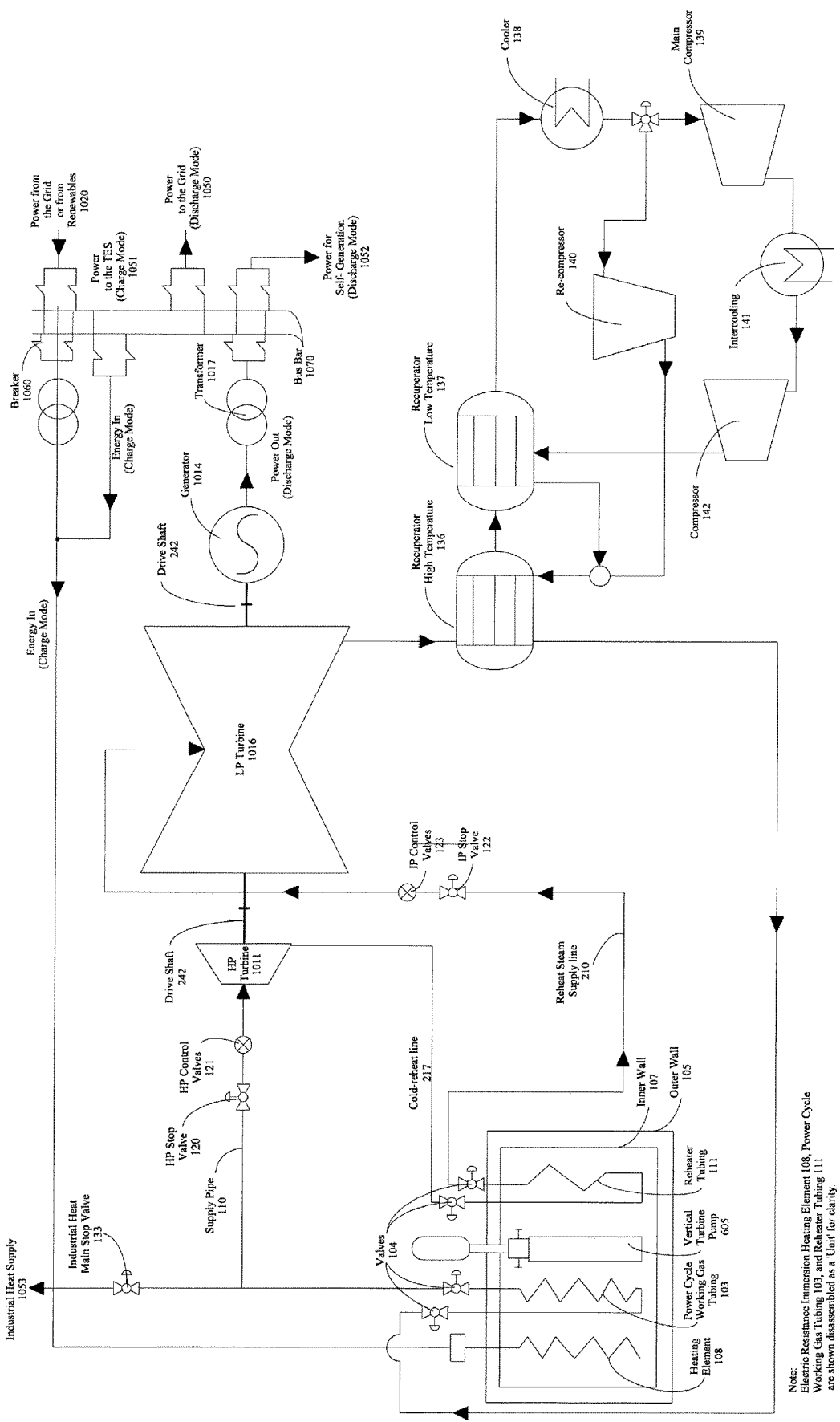
FIG. 10C displays a block diagram of an energy recovery system interfaced with renewable energy and conventional energy producers that consists of a series of repeating thermodynamic processes along a closed process path for the s-$CO_2$ Brayton Cycle.

FIG. 10C displays a flow diagram of an energy recovery system 1010 interfaced with renewable energy producers. TES vessel 100 may be electrically connected to a breaker 1060 and an energy exchange interface 1070 (for example, a DC bus), which may electrically connect TES vessel 100 to a plurality of renewable energy producers such as, but not limited to renewable power system 1020.

Once TES vessel 100 receives electricity, the electricity may be converted into sensible heat via heating elements 108 (charging regime) and transferred to a power cycle working gas 209 (s-$CO_2$ in this instance) sent through power cycle working gas tubing 103 surrounding the heating elements 108. It is noted that the heat from the heating elements 108 may be transferred to a thermal storage fluid 109 for storage until the heat is absorbed by the power cycle working gas 209. In a closed-loop Brayton cycle, the power cycle working gas (s-$CO_2$) 209 (discharging regime) where in the first stage the hot s-$CO_2$ may be sent to a high-pressure turbine 1011 where the energy is extracted from the s-$CO_2$ and is converted into rotational energy, which is then converted into electricity via generator 1014.

After the $CO_2$ exits the turbine, exhaust from the high-pressure turbine 1011 may be returned to the TES vessel 100 via the cold-reheat line 217. The s-$CO_2$ exhaust enters the charge side of the reheater tubing 111. The s-$CO_2$ may be reheated and then exits TES vessel 100 via the reheat supply line 210. In the second stage, reheated s-$CO_2$ may be admitted to the low-pressure turbine 1016 chamber. The s-$CO_2$ exhaust from the end of the low-pressure turbine 1016 and it enters a split-flow, recuperative cycle characterized by a multistage compression process with multi-stage inter-cooled compression in the main compression line and reheated expansion processes. The s-$CO_2$ flows into the hot side of the high-temperature recuperator (HTR) 136 and low-temperature recuperator (LTR) 137. After the cooling process in the cooler 138, the S—$CO_2$ may be split into two streams: one stream flowing to the inlet of main compressor (MC) 139 which increases the s-$CO_2$ up to the necessary pressure and the other going to the re-compressor 140. The outlet flow of the MC 139 flows to intercooling 141, proceeds to compressor 142 and returns to the LTR 137. The s-$CO_2$ enters HTR 136 and returns to the TES vessel 100 to continue the cycle.

FIG. 11 displays a method 1100 for recovering electricity generated from at least one energy source. Method 1100 may include collecting 1110 electricity from at least one energy source in a thermal energy storage vessel 100. The electricity may then be converted 1120 to heat via at least one heating element 108 positioned within the thermal energy storage vessel 100 and at least partially submerged in a thermal storage fluid 109 heated by the heat. Power cycle working gas 209 is then passed 1030 through tubing 103 adjacent each of the heating elements 108, which heats 1040 the power cycle working gas 209 via the heated thermal storage fluid 109 contained within thermal energy storage vessel 100. The heated power cycle working gas 209 may then be sent 1050 to generator 1014 to convert 1060 the heated steam into usable electricity. Utilizing method 1100, usable electricity may be provided on demand and may be sent 1170 to a power grid.

The power cycle working gas 209 may be sent through the thermal energy storage vessel 100 when the thermal energy storage vessel 100 is utilizing less than full capacity of the at least one heating element 108.

It is noted that the at least one energy source utilized in method 1100 may comprise solar energy, wind energy, biomass, hydropower, geothermal energy, and conventional energy sources.

Various attachment and fitting techniques and equipment (male-female engagement, fastening means, adhesives) may be utilized in any of the disclosed embodiments in order for components of the embodiments to efficiently and/or properly attach to one another and so that TES vessel 100/TES Power Storage System 1010 can efficiently and/or properly function. For example, lifting plate 221 may be affixed to vessel roof 204 via a bolt (male engagement element) and threading (female engagement element) found in vessel roof 204 which may provide security and stability to lifting plate 221 and TES vessel 100 but may also allow lifting plate 221 to be easily removable from TES vessel 100.

For the purposes of this disclosure, the terms "thermal storage fluid 109" ("TSF"), "thermal energy fluid" ("TEF") and "heat storage fluid" ("HSF") may be synonymous.

For the purposes of this disclosure, the terms "power cycle working gas" and "gas 209" are synonymous.

For the purposes of this disclosure, the terms "power cycle working gas tubing 103", "tubing", "helical tubing", and "coiled tubing" are synonymous.

For the purposes of this disclosure, the term "power cycle working gas tubing 103" may collectively refer to elements "power cycle working gas tubing 103", "gas return pipe 101", and "gas supply pipe 110."

For the purposes of this disclosure, the terms tube/tubing and pipe/piping may be used interchangeably.

In embodiments, the term "heating element 108" may refer to one heating element 108 or may refer to more than one heating element 108.

In embodiments, thermal storage fluid 109 may comprise at least one of molten salt, solid silicon, molten silicon, molten aluminum, concrete, rock or other such materials that demonstrate to be a heat transfer fluid that can act as thermal storage media with optimal economics or operational characteristics.

It is noted that TES system 100, once it receives electricity from at least one of renewable energy systems 1020 (energy sources), TES system 100 stores the energy and returns the energy in the form of usable electricity dispatchable to the grid, on demand.

It is noted that power cycle working gas 209 returned to TES vessel 100 via gas return pipe 101 may be superheated steam with a temperature of around 280 degrees Celsius and power cycle working gas 209 sent to turbine 1011 via gas supply pipe 110 may be supercritical steam with a temperature up to 550 degrees Celsius.

It is noted that the terms "gas return pipe 101" and "gas supply pipe 110" may alternatively be referred to as "fluid return pipe" and "fluid supply pipe."

In embodiments, power cycle working gas 209 may be a state of matter other than a gas.

It is noted that in embodiments, heating element 108 may refer to the combination of multiple heating portions (typically referred to as heating elements in the art). In addition, heating element 108 may collectively refer to all of the components found in a heater.

It is noted that in embodiments, heating portions of heating elements 108 (the portions that heat up) may comprise the shape of an elongated "U" so that a single portion may fit into a pair of baffle orifices 905, heat shield orifices 910, and flange orifices 915.

A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

I claim:

1. A thermal energy storage vessel for storing and recovering electricity generated from at least one energy source, comprising:
   a vessel floor;
   a vessel roof;
   a plurality of walls affixed to the vessel floor and the vessel roof;
   a first pipe header affixed to at least one supply pipe;
   a second pipe header affixed to at least one return pipe;
   at least one tubing, a respective one of each of the at least one tubing positioned adjacent a respective one of each of at least one heating element, a respective one of each of the at least one tubing affixed to a respective one of each of the at least one supply pipe and to a respective one of each of the at least one return pipe,
   wherein each of the at least one tubing and heating element are at least partially submerged in a thermal storage fluid contained within the vessel; and
   a pump configured to relocate the thermal storage fluid from a bottom of the thermal energy storage vessel to a top of the thermal energy storage vessel.

2. The thermal energy storage vessel of claim 1, further comprising:
   an interior containment vessel;
   an insulation layer comprising ceramic wool, wherein the insulation layer is configured between the interior containment vessel and the vessel roof, further wherein the insulation layer is configured between the interior containment vessel and the plurality of walls affixed to the vessel floor and the vessel roof;
   an internal layer comprising fire brick, wherein the internal layer is configured between the interior containment vessel and the vessel floor; and
   a sand layer configured between the internal layer and the vessel floor, wherein the sand layer encompasses a thermosyphon device.

3. The thermal energy storage vessel of claim 1, wherein the at least one heating element and a respective one of the at least one tubing is removably engageable with the vessel.

4. The thermal energy storage vessel of claim 1, wherein at least one of a respective one of the at least one heating element and a respective one of the at least one tubing is removably engageable with the vessel via a respective one of an at least one lifting plate engaging the vessel roof.

5. The thermal energy storage vessel of claim 4, wherein the at least one heating element and the at least one tubing are removably engageable with the vessel via the lifting plate, and wherein the at least one heating element, the at least one tubing, and the lifting plate are assembled as a solitary unit.

6. The thermal energy storage vessel of claim 1, wherein a power cycle working gas stores heat transferred from the thermal storage fluid,
   and wherein the thermal storage fluid has a melting point below 350 degrees Celsius.

7. The thermal energy storage vessel of claim 6, wherein the power cycle working gas comprises steam.

8. The thermal energy storage vessel of claim 6, wherein the power cycle working gas comprises supercritical carbon dioxide.

9. The thermal energy storage vessel of claim 1, wherein a respective one of each of the at least one tubing is coiled around a respective one of each of the at least one heating element.

10. The thermal energy storage vessel of claim 1, wherein the at least one energy source comprises at least one of solar energy, wind energy, biomass, hydropower, geothermal energy, or at least one conventional energy source.

11. A method for recovering electricity generated from at least one energy source, comprising:
   collecting electricity from the at least one energy source in a thermal energy storage vessel;
   converting the electricity to heat via at least one heating element positioned within the thermal energy storage vessel, the at least one heating element at least partially submerged in a thermal storage fluid heated by the heat;
   pumping the thermal storage fluid from a bottom of the thermal energy storage vessel to a top of the thermal energy storage vessel;
   passing power cycle working gas through at least one tubing;
   heating the power cycle working gas via the thermal storage fluid; and
   sending the heated power cycle working gas to a steam turbine where it is converted into rotational energy which is in turn converted into electrical energy via a generator or alternatively,
   sending the heated working gas via a piping system for use as on-demand industrial heat that consists of a series of repeating thermodynamic processes along a closed process path.

12. The method of claim 11, further comprising providing the usable electricity on demand.

13. The method of claim 11, further comprising sending the usable electricity to a power grid.

14. The method of claim 11, wherein the power cycle working gas is sent through the thermal energy storage vessel when the thermal energy storage vessel is utilizing less than full capacity of the at least one heating element.

15. The method of claim 11, wherein the at least one energy source comprises solar energy, wind energy, biomass, hydropower, geothermal energy, or conventional energy.

16. An energy recovery system for storing and recovering electricity generated from at least one energy source, comprising:
- a thermal energy storage vessel, wherein the thermal energy storage vessel converts electricity into an alternative energy source, the thermal energy storage vessel comprising:
  - at least one tubing, a respective one of each of the at least one tubing positioned adjacent a respective one of each of at least one heating element, a respective one of each of the at least one tubing affixed to a respective one of each of an at least one supply pipe and to a respective one of each of an at least one return pipe, wherein each of the at least one tubing and heating element are at least partially submerged in a thermal storage fluid contained within the thermal energy storage vessel;
  - a pump configured to relocate the thermal storage fluid from a bottom of the thermal energy storage vessel to a top of the thermal energy storage vessel;
- an electrical connection for sending the electricity from the at least one energy source to the thermal energy storage vessel;
- a turbine operatively connected to the thermal energy storage vessel;
- a generator operatively connected to the turbine; and
- an energy exchange interface electrically connected to the thermal energy storage vessel, the generator, and a grid;
- wherein the thermal energy storage vessel provides the alternative energy source to the turbine and subsequently the generator to convert the alternative energy source into electricity to send to the grid.

17. The energy recovery system of claim 16, wherein the vessel comprises at least one removably engageable heating element and the at least one tubing positioned within the vessel.

18. The energy recovery system of claim 16, wherein the thermal energy storage vessel provides the alternative energy source to the turbine in the form of a power cycle working gas.

19. The energy recovery system of claim 16, wherein the alternative energy source is stored in the form of heat when stored in the thermal energy storage vessel.

20. The energy recovery system of claim 19, wherein the alternative energy source is stored in a thermal storage fluid contained within the thermal energy storage vessel,
  and wherein the thermal storage fluid has a melting point below 350 degrees Celsius.

21. The energy recovery system of claim 16, wherein the alternative energy is provided as electricity to the grid.

22. The energy recovery system of claim 16, wherein the alternative energy is provided on demand.

* * * * *